US012503375B2

(12) United States Patent
Zheng et al.

(10) Patent No.: US 12,503,375 B2
(45) Date of Patent: Dec. 23, 2025

(54) FARM WASTE-DERIVED RECYCLABLE PHOTOTHERMAL EVAPORATOR

(71) Applicants: Northeastern University, Boston, MA (US); Providence College, Providence, RI (US)

(72) Inventors: Yi Zheng, Canton, MA (US); Yanpei Tian, Boston, MA (US); Xiaojie Liu, Boston, MA (US); Yinsheng Wan, Lincoln, RI (US)

(73) Assignees: Northeastern University, Boston, MA (US); Providence College, Providence, RI (US)

( * ) Notice: Subject to any disclaimer, the term of this patent is extended or adjusted under 35 U.S.C. 154(b) by 90 days.

(21) Appl. No.: 18/280,865

(22) PCT Filed: Feb. 10, 2022

(86) PCT No.: PCT/US2022/015889
§ 371 (c)(1),
(2) Date: Sep. 7, 2023

(87) PCT Pub. No.: WO2022/191948
PCT Pub. Date: Sep. 15, 2022

(65) Prior Publication Data
US 2024/0140826 A1 May 2, 2024

Related U.S. Application Data

(60) Provisional application No. 63/159,215, filed on Mar. 10, 2021.

(51) Int. Cl.
*C02F 1/14* (2023.01)
*B01D 1/00* (2006.01)
(Continued)

(52) U.S. Cl.
CPC .............. *C02F 1/14* (2013.01); *B01D 1/0035* (2013.01); *C02F 1/048* (2013.01); *F24S 10/13* (2018.05); *C02F 2103/08* (2013.01)

(58) Field of Classification Search
CPC .......... C02F 1/14; C02F 1/048; B01D 1/0035; F24S 10/13
See application file for complete search history.

(56) References Cited

U.S. PATENT DOCUMENTS 3,876,451 A * 4/1975 Zall .................. C02F 1/283
210/906
6,135,370 A 10/2000 Arnold
(Continued)

FOREIGN PATENT DOCUMENTS

DE 19757643 A1 6/1999
EP 1688475 A1 8/2006
WO WO-2022/191948 A1 9/2022

OTHER PUBLICATIONS

Espacenet Machine Translation of DE 19757643 obtained Apr. 29, 2025. (Year: 2025).*
(Continued)

*Primary Examiner* — Jonathan Miller
(74) *Attorney, Agent, or Firm* — Dana M. Gordon; John D. Lanza; Foley Hoag LLP

(57) ABSTRACT

A carbonized manure photothermal evaporator derived from naturally abundant farm waste has high solar absorptance, effective water transportation, and rapid salt dissipation. It achieves high evaporation under 1-sun irradiance and is recyclable, durable, and cost-effective for use in energy-efficient solar-driven interfacial desalination.

18 Claims, 23 Drawing Sheets

(51) Int. Cl.
*C02F 1/04* (2023.01)
*F24S 10/13* (2018.01)
*C02F 103/08* (2006.01)

(56) References Cited

U.S. PATENT DOCUMENTS

| | | | | |
|---|---|---|---|---|
| 6,274,004 | B1* | 8/2001 | Andersen | C02F 1/14 |
| | | | | 203/1 |
| 9,459,024 | B2* | 10/2016 | Ghasemi | F24S 90/00 |
| 10,234,172 | B2* | 3/2019 | Ni | F24S 90/00 |
| 10,351,455 | B2 | 7/2019 | Moller et al. | |
| 10,729,988 | B2* | 8/2020 | Singamaneni | B01D 3/38 |
| 11,312,640 | B2* | 4/2022 | Wang | B01D 5/0015 |
| 11,739,985 | B2* | 8/2023 | Lee | B29C 44/3442 |
| | | | | 264/45.3 |
| 12,157,683 | B2* | 12/2024 | Lee | B01J 20/28011 |
| 2010/0282654 | A1* | 11/2010 | Hauschild | C02F 3/302 |
| | | | | 210/151 |
| 2015/0072133 | A1* | 3/2015 | Ghasemi | B32B 5/18 |
| | | | | 428/312.2 |
| 2020/0354233 | A1* | 11/2020 | Wang | C02F 1/14 |
| 2022/0064913 | A1* | 3/2022 | Wang | B01D 53/0462 |
| 2023/0338870 | A1* | 10/2023 | Zheng | C02F 1/048 |

OTHER PUBLICATIONS

International Search Report and Written Opinion for International Application No. PCT/US2022/015889 dated Apr. 28, 2022.

Libra et al., "Hydrothermal carbonization of biomass residuals: A comparative review of the chemistry, processes and applications of wet and dry pyrolysis," Biofuels, 2(1): 89-124 (2011).

Tian et al., "Carbonized cattle manure-based photothermal evaporator with hierarchically bimodal pores for solar desalination in high-salinity brines," Desalination, 520: 115345 (2021).

Tian et al., "Farm-waste-derived recyclable photothermal evaporator," Cell Reports Physical Science, 2(9): 100549 pp. 1-14 (2021).

Zhang et al., "Harnessing Solar-Drive Photothermal Effect toward the Water-Energy Nexus," Advanced Science, 6(18): 1900883 pp. 1-28 (2019).

* cited by examiner

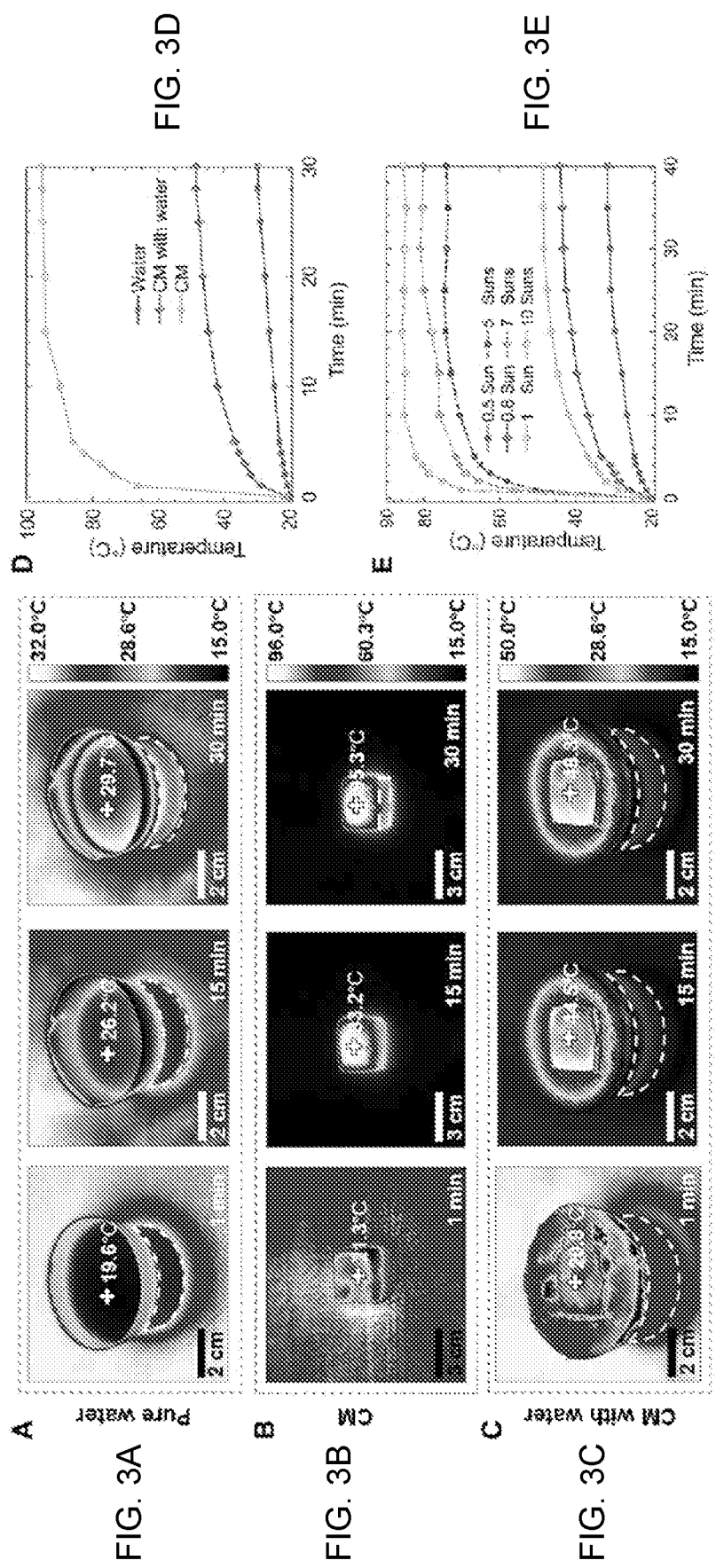

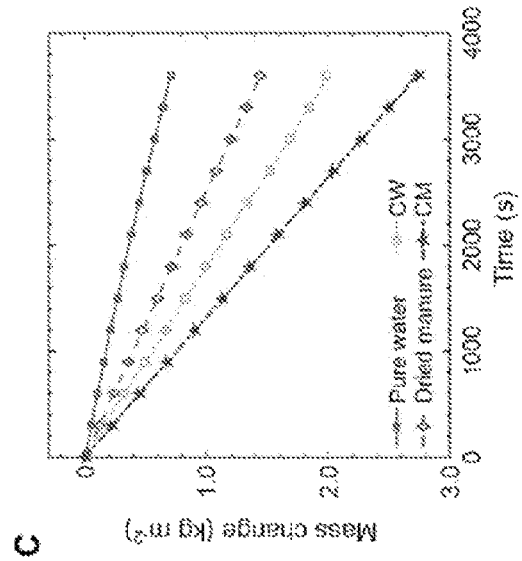
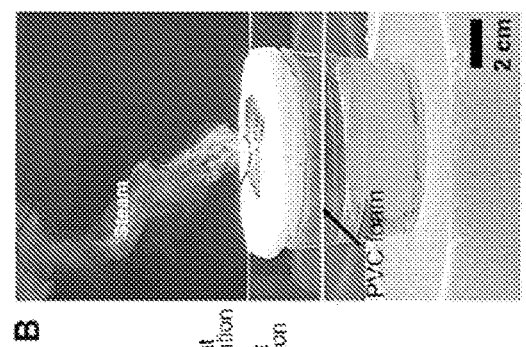
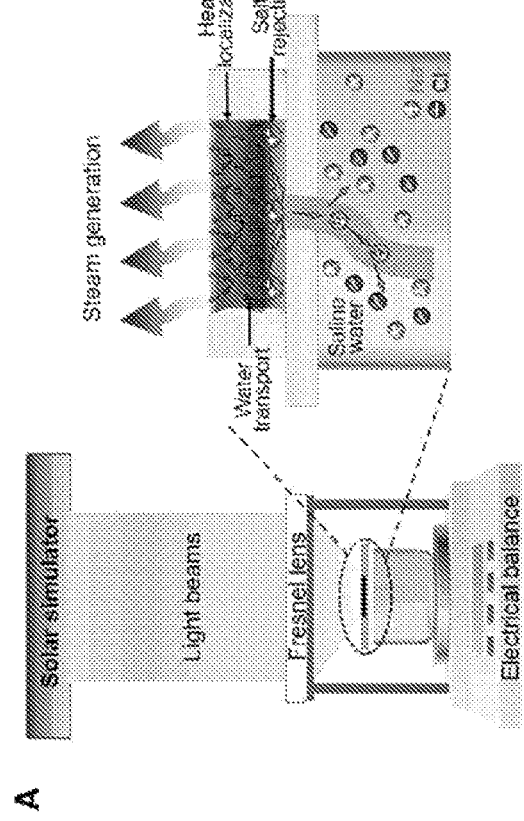
FIG. 4C
FIG. 4B
FIG. 4A

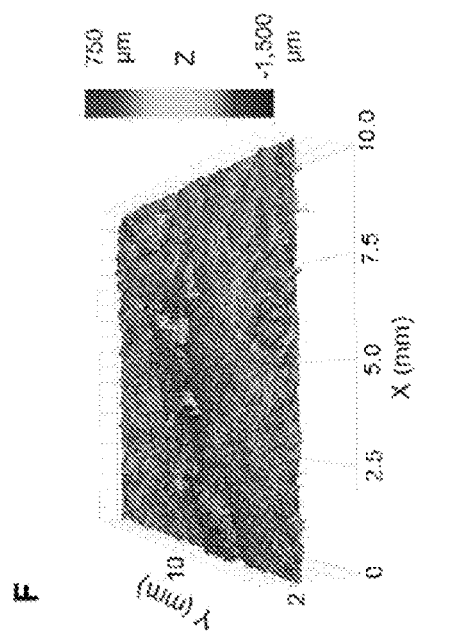
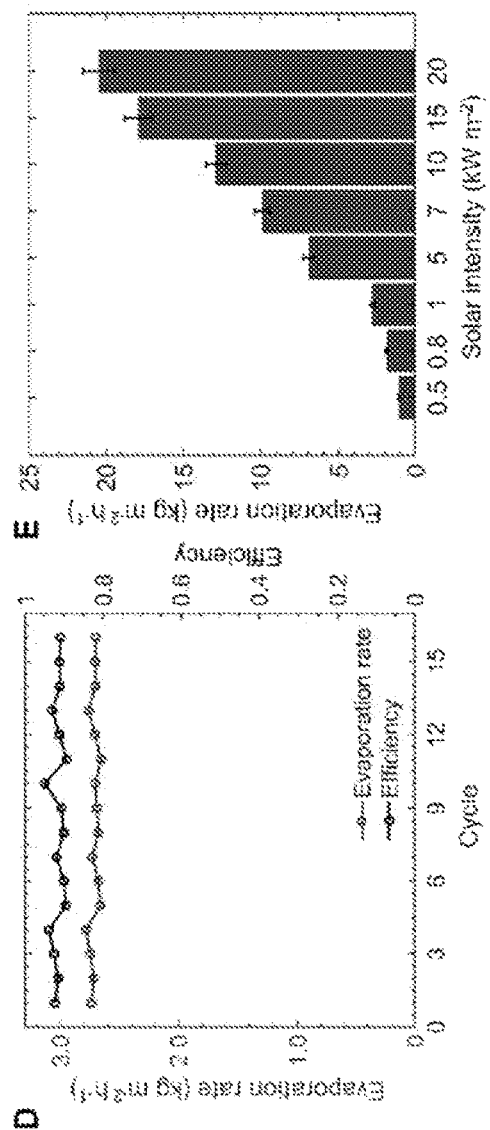
FIG. 4D
FIG. 4E
FIG. 4F

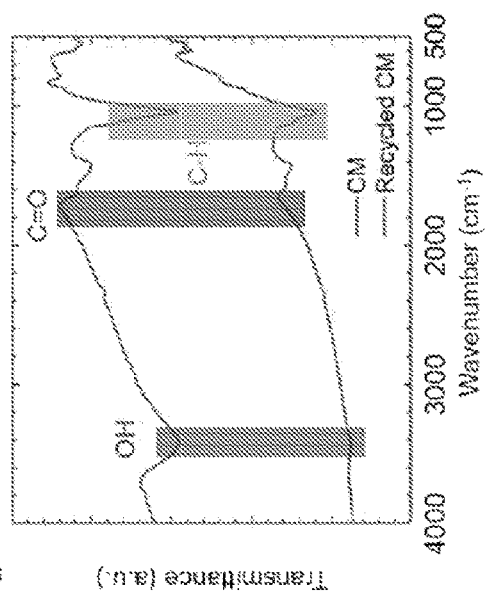
FIG. 5G
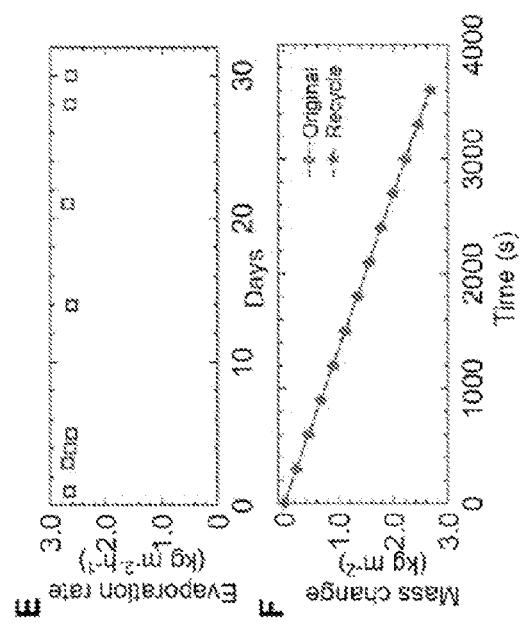
FIG. 5E
FIG. 5F
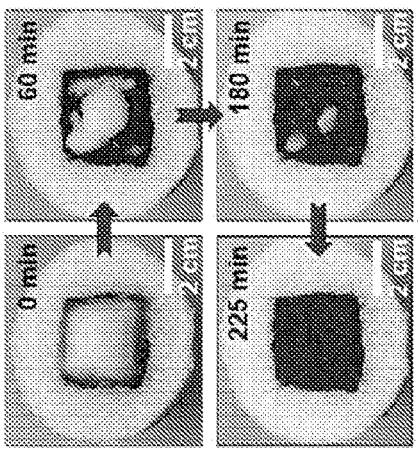
FIG. 5D

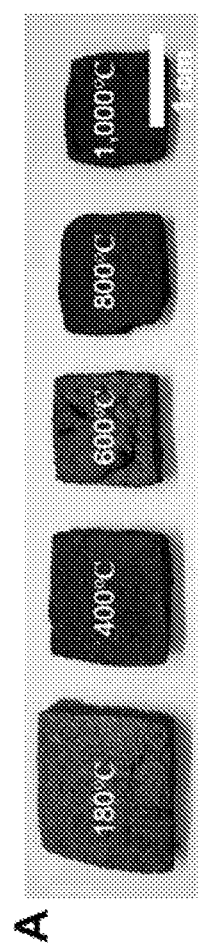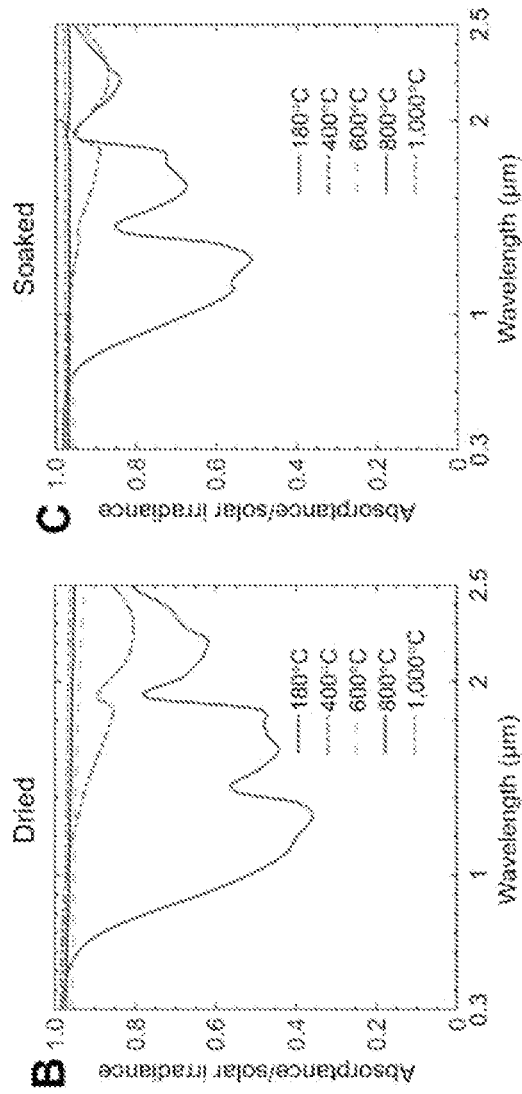
FIG. 9A
FIG. 9B
FIG. 9C

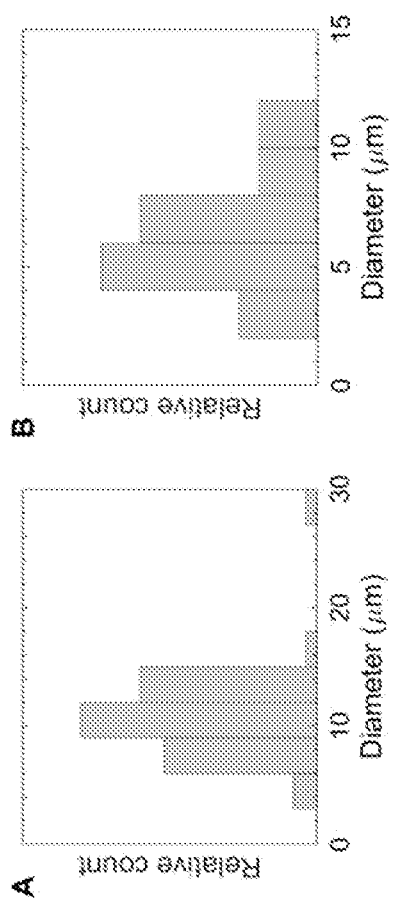
FIG. 12A
FIG. 12B
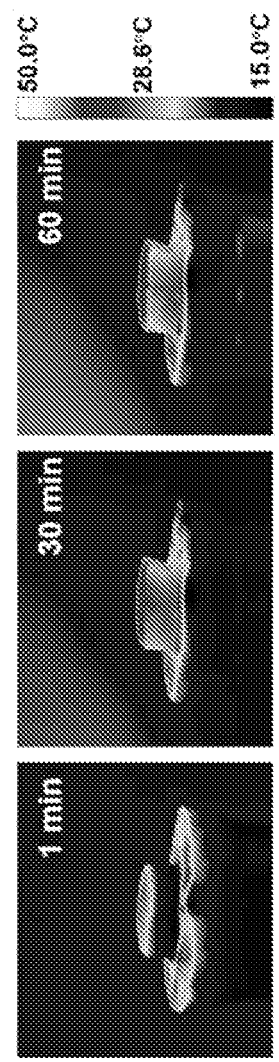
FIG. 13

Table S1. Surface roughness results of the CM.

| Material | Sa (um) | Sku | Sp (um) | Sq (um) | Ssk | Sv (um) | Sz (um) |
|---|---|---|---|---|---|---|---|
| CM | 71.32 | 21.45 | 1201.68 | 119.44 | -3.15 | -1666.70 | 2868.39 |

Mean: The average of all of the Z values in the imaged area.

Root-Mean-Square Roughness ($S_q$): the standard deviation of the Z values in the image. It is calculated according to the formula: $S_q=\sqrt{\Sigma(Z_i-Z_{avg})^2/N}$ where $Z_{avg}$ is the average Z value within the image; $Z_i$ is the current value of Z, and N is the number of points in the image.

Roughness Average ($S_a$): the mean value of the surface relative to the center plane and is calculated using the formula: $S_a=(1/N)\Sigma|Z_i|$

Maximum Peak Height ($S_p$): the tallest height in the profile, relative to the mean plane.

Maximum Valley Depth ($S_v$): the lowest height in the profile, relative to the mean plane.

Maximum Height of the Profile ($S_z$): the difference in height between the highest and lowest points of the surface, relative to the mean plane. $S_z=S_p-S_v$

Roughness skewness ($S_{sk}$): a measure of the asymmetry of the probability distribution of the Z values. $S_{sk}=[1/(NS_q^3)]\Sigma(Z_i^3)$

Roughness kurtosis ($S_{ku}$): a measure of the peakedness of the probability distribution of the Z values. $S_{ku}=[1/(NS_q^4)]\Sigma(Z_i^4)$

Table S2. Steam generation performance of our CM evaporator compared with other designs in previously published literature.

| Materials[a] | Evaporation rate under 1 Sun(kg m$^{-2}$ h$^{-1}$) | Efficiency(%) | Dimensions | Reference |
|---|---|---|---|---|
| Wood/CNTs | 0.95 | 63 | 2D | Ref[1] |
| Carbonized mushrooms | 1.48 | 78 | 2D | Ref[2] |
| Plasmonic Wood | 1.03 | 85 | 2D | Ref[3] |
| CNT/GO layer | 1.25 | 86 | 2D | Ref[4] |
| Carbonized daikon | 1.57 | 86 | 2D | Ref[5] |
| Flame-treated wood | 0.92 | 91 | 2D | Ref[6] |
| Polyurethane sponge | 1.25 | 73 | 2D | Ref[7] |
| Graphite treated wood | 1.12 | 80 | 2D | Ref[8] |
| CNT aerogels | 1.43 | 87 | 2D | Ref[9] |
| GO-chitosan | 1.44 | 86 | 2D | Ref[10] |
| 3D Mxene | 1.41 | 89 | 2D | Ref[11] |
| Carbonized loofah | 1.42 | 90 | 2D | Ref[12] |
| Carbonized pencil | 1.20 | 82 | 2D | Ref[13] |
| Fiber felt | 1.48 | 87 | 2D | Ref[14] |
| PVA/Ti$_3$C$_2$T$_x$ MXene and RGO | 3.62 | 85 | 2D | Ref[15] |
| Carbonized loofah sponge | 1.36 | 84 | 2D | Ref[16] |
| Ceramic-based aerogel | 1.5 | -- | 2D | Ref[17] |
| CM | 2.81 | 94.7 | 2D | Our work |
| GO foam | 4.35 | -- | 3D | Ref[18] |
| Co$_3$O$_4$/Ti$_3$C$_2$ MXene-based fabric | 1.89 | -- | 3D | Ref[19] |
| RGO bamboo paper | 2.94 | -- | 3D | Ref[20] |
| Co$_3$O$_4$@polydopamine | 3.71 | -- | 3D | Ref[21] |
| PDA/RGO | | | | |
| ASA | 1.7 | -- | 3D | Ref[22] |
| CuO | 4.1 | -- | 2.5D | Ref[23] |

[a]CNT: carbon nanotube; GO: graphite oxide; CM: carbonized manure; PVA: polyvinyl alcohol; Co$_3$O$_4$: cobalt oxide; Ti$_3$C$_2$: titanium carbide; PDA: polydopamine; PS: polystyrene; PPy: Polypyrrole; ASA: ac-rylonitrile-styrene-acrylat;

FARM WASTE-DERIVED RECYCLABLE PHOTOTHERMAL EVAPORATOR

CROSS REFERENCE TO RELATED APPLICATIONS

This application is a 35 U.S.C. § 371 national-stage application based on International Application No. PCT/US2022/015889, filed Feb. 10, 2022; which claims the benefit of priority to U.S. Provisional Patent Application No. 63/159,215, filed Mar. 10, 2021.

STATEMENT AS TO FEDERALLY SPONSORED RESEARCH

This invention was made with government support under Grant No. CBET-1941743 awarded by the NSF National Science Foundation. The government has certain rights in the invention.

BACKGROUND

Increasing water pollution and groundwater exploitation are making clean water scarce [1]. One-fourth of people live in water-stressed regions with inadequate access to commercial water purification [2]. Generating water from seawater or sewage requires sophisticated engineering systems optimized in chemistry, physics, and materials science [3,4]. Serious impediments to sustainable water treatment range from energy consumption to expensive infrastructure installation and maintenance, exemplified by reverse osmosis systems [5] and multistage flash distillation [6], establishing a barrier for sustainable water treatments [7]. At present, solar-driven distillation has drawn growing attention because of its abundance, sustainability, and negligible carbon footprint [8]. Essential to any solar-driven water purification approach are metrics such as cost, efficiency, scalability, and water quality.

System efficiency can be improved by broad-spectrum sunlight trapping, enhanced photothermal conversion, dynamic water transport, heat localization, and salt rejection. Approaches range from selecting light absorbing nanomaterials to metamaterials rich in macropores or honeycombs [9,10] and trapping light inside microstructures such as macropores [11-13]. One can also use superhydrophilic sponges to enable sufficient water transport to evaporation surfaces [14,15]. Solar-driven interfacial evaporation, localizing solar thermal energy within a confined region of the liquid-air interface as opposed to volumetric heating, can minimize thermal diffusion to the underlying bulk water. Artificially designed or naturally existing salt-rejection channels have been used to protect evaporators from salt accumulation, allowing for continuous water desalination [16,17]. The above-mentioned design principles, high-absorptance solar absorbers, exceptional thermal localization, and optimized salt/water pathways have been demonstrated to approach the evaporation rate of the theoretical ceiling, 1.60 kg m-2 h-1 under 1 sun [18,19]. Hydrogel-based solar evaporators, which tune the interactions between water molecules and polymer networks and tailed surface wetting states, have been validated to achieve recording-breaking evaporation [20]. However, carbonized biomass, including wood [21], sugarcane stems [22], and mushrooms [23], is a competitive materials candidate for a thermal evaporator [24].

Recently, biomass-derived solar-driven water purification has received increasing attention. Taking advantage of the umbrella-shaped structure, Xu et al. [23] used calcined mushrooms as a solar evaporation device characterized by efficient water supply and vapor escape. He et al. [21] developed a bimodal porous balsawood-based salt-rejecting evaporator for high-salinity solar desalination. Fang et al. [25] substantiated another approach of using carbonized lotus seedpods rich in interconnected hierarchical pore structures for solar evaporation. Also worth noting, Geng et al. [26] developed a biowaste-based evaporator, using carbonized pomelo peels, whose microstructure is fractal in geometry. Those approaches are advantageous to wood-based evaporators that are burdened with a low evaporation rate and photothermal efficiency, owing to limited water transportation paths. However, one main deficiency in the mushroom and pomelo peel is that experiments were not based on saltwater, hence, they are not relevant to the problem of salt accumulation.

Manure, an organic matter chiefly consisting of water and cellulose, is an abundant biomass worldwide and is commonly used agriculturally as an organic fertilizer [27] or a biomass fuel precursor [28]. The randomly dispersed network of cellulose fibers forms percolated macropores inside the manure, offering a natural retention capacity of water. Based on the natural properties of manure, we disclose herein carbonized manure (CM) as a material for efficient and sustainable photothermal evaporation, and we demonstrate a prototype that exhibits light trapping, rapid water pumping, and efficient salt rejection. The top diffused surface of CM features a solar absorptance of 0.98 due to light trapping enabled by multireflection inside the carbonized fibers. Strong capillarity as a result of the inherent superhydrophilicity pumps water rapidly to the evaporating interfaces. Heat localization of the poorly thermal conductive CM prevents the dissipation of heat downward to the water reservoir. These features yield an evaporation rate of 2.81 kg $m^{-2}$ $h^{-1}$ and a photothermal efficiency of 94.7% under 1 sun irradiance. Moreover, the microchannels efficiently inhibit salt accumulation and ensure rapid salt drainage, which features an evaporation rate of 2.25 kg $m^{-2}$ $h^{-1}$ with high-salinity water (15 wt % NaCl). The fabricated CM evaporator prototype is robust against harsh environments with high acidity/alkalinity (pH, 1-13) or in boiling and ultrasonic water. After a long period of operation, the CM can be recalcined and recycled, becoming fresh after blending with additional fresh manure. The hemispherical CM structure is shown to yield an evaporation rate of 7.00 kg $m^{-2}$ $h^{-1}$, providing another option for the 3-dimensional (3D) solar evaporation device. The CM evaporator has a low raw materials cost and \$1.32 $m^{-2}$ electricity usage, making it competitive for large-scale implementation. The CM-based evaporator achieves a balance between high evaporation rate, facial fabrication, cost-effectiveness, and easy deployment. The raw material for fabricating the CM photothermal evaporator is abundantly available and sustainable around the world, and the carbonization method is mature and relatively cost-effective for boosting the scalable deployment of solar desalination. Another key point of the CM photothermal evaporator is that it can be recycled and becomes a functional material if mixed with additional fresh manure, while contributing to sustainable development. In this way, biowaste can be used for scalable water generation.

BRIEF SUMMARY OF THE DISCLOSURE

In accordance with one or more embodiments, a photothermal evaporator is disclosed for a water desalination system. The photothermal evaporator comprises a planar carbonized manure (CM) evaporator configured to have one side positioned in a body of water and an opposite side positioned in air above the body of water and exposed to incident sunlight. The CM evaporator is configured to draw water from the body of water through capillary action, convert the incident sunlight to heat for evaporating the water, and reject salt to the body of water.

In accordance with one or more further embodiments, a method of manufacturing a photothermal evaporator for a water desalination system is disclosed. The method includes the steps of (a) crushing manure into pieces; (b) molding the pieces of manure into a bulk form; (c) drying the manure in the bulk form to form dried manure; and (d) carbonizing the dried manure to form a carbonized manure (CM) evaporator.

In accordance with one or more further embodiments, a solar-driven evaporation system is disclosed comprising a body of water and a photothermal evaporator. The photothermal evaporator comprises a planar carbonized manure (CM) evaporator having one side positioned in the body of water and an opposite side positioned in air above the body of water and exposed to incident sunlight. The CM evaporator is configured to draw water from the body of water through capillary action, convert the incident sunlight to heat for evaporating the water, and reject salt to the body of water.

BRIEF DESCRIPTION OF THE DRAWINGS

FIG. 2A shows photographs of the dried manure (left) and CM (right).

FIGS. 2B and 2C show FTIR and XRD spectra, respectively, of the dried manure and CM carbonized at various temperatures. The circled area represents the spectral peak of cellulose. FIG. 2D shows the absorptance spectrum of the CM exhibited against AM 1.5 solar irradiance (ASTM G173). FIG. 2E shows the average solar absorptance spectra for the CM across various angles of incidence (AOI). FIG. 2F shows density and porosity of the 1800 C dried manure and CM carbonized at different temperatures. FIGS. 2G and 2H show SEM images of the top view and side view, respectively, of the CM. FIG. 2I shows the dynamic contact angle measurement of the CM. FIG. 2J shows rapid water absorption of the CM under a high-speed camera.

FIGS. 3A-3E show the photothermal response of the CM evaporator under an IR thermal camera. FIGS. 3A-3E show IR images displaying the temperature distributions of the pure water, dried CM, and CM with adequate water supply from a cotton wipe under 1 sun irradiance after 1, 15, and 30 min. The white cross points to the same location of CM. FIGS. 3D and 3E show continuous temperature variations of the pure water, dried CM, and CM with adequate water supply from a cotton wipe under 1 sun (D) and various suns (E) irradiance.

FIGS. 4A-4I show an experimental setup and the solar evaporation performance of a CM evaporator in accordance with one or more embodiments. FIG. 4A shows a schematic illustration of the experimental setup for solar steam generation. FIG. 4B is a photograph of the evaporator showing visible vapor under 5 suns. The circled area shows the diffusion area of the generated steam. FIG. 4C shows mass changes of the pure water, dried manure, carbonized wood (CW), and CM under a solar intensity of 1 kW m$^{-2}$. FIG. 4D shows evaporation rate and efficiency of the CM evaporator under 1 sun of long-time cycles. FIG. 4E shows an evaporation rate evaluation of the CM evaporator under various solar intensities. Error bars represent the standard deviations of 3 repeated experimental results. FIG. 4F shows the topography of the CM, indicating the increased evaporation area. FIG. 4G shows mass changes of the pure water and CM evaporator in the dark environment for 12 h. FIG. 4H shows DSC thermograms of dried manure, CM, and pure water. FIG. 4I shows the water evaporation rate and efficiency comparison between the CM evaporator and previously reported devices. Details are listed in Table S2 (FIG. 19) [23], [29]-[43].

FIGS. 5A-5J show the desalination, salt-rejection, and recycling capabilities of an exemplary CM evaporator in accordance with one or more embodiments. FIG. 5A shows mass changes of the CM evaporator in water of different salinities. FIG. 5B shows evaporation rates of the CM evaporator under solar irradiance of 1, 5, 7, 10, 10, and 15 kW m$^{-2}$ with 3.5 wt % NaCl solution. Error bars represent the standard deviations of 3 repeated experimental results. FIG. 5C shows the microscopic top view and cross-section for the CM evaporator under 10 suns for 6 h. FIG. 5D shows results of a salt-rejection experiment using the 3.5 wt % NaCl solutions and 7 g NaCl showing the salt-dissipation functionality of the CM evaporator. FIG. 5E shows evaporation rates of the CM evaporator immersed in 15 wt % NaCl solution for a long time. FIG. 5F shows mass changes of an original CM evaporator and the recycled CM evaporator under 1 sun. FIG. 5G shows FTIR spectra of the CM and recycled CM. FIG. 5H shows the salinity comparison of the seawater before and after desalination. FIG. 5I shows average solar absorptance of the CM evaporator after treatment under various harsh environments: 0, original CM; 1, pH 1 solution for 24 h; 2, pH 13 solution for 24 h; 3, 95 CC water for 2 h; 4, ultrasonic in water for 1 h; 5, immersed in 15 wt % NaCl solution for 14 days; and 6, working under a 10-kW m$^{-2}$ solar irradiance for 6 h. Error bars represent the standard deviations of 3 repeated-measured results. FIG. 5J shows mass changes of a 2D flat CM evaporator and a 3D hemisphere CM evaporator with pure water and 3.5 wt % NaCl solutions, respectively.

FIGS. 9A-9C show optical properties of CM after different temperatures carbonization. FIG. 9A shows photographs illustrating baked manure and CMs fabricated at different carbonized temperatures. The reflectance, transmittance, absorptance spectrum of the dried and soaked manure processed at different temperatures are shown in FIGS. 9B and 9C, respectively.

FIG. 10A shows the thermal conductivity of the CM and carbonized wood (CW) before and after being water-soaked. FIG. 10B shows a comparison of water absorption ratios for the dried manure, CM, wood, and CW. This ratio is calculated by dividing the mass of soaked water by the original mass.

FIGS. 12A-12B are graphs showing size distribution of the CM fibers from the top view (FIG. 12A) and side view (FIG. 12B).

FIG. 13 shows the temperature distribution of a CM evaporator under 1 sun irradiance.

FIG. 18 shows Table S1 depicting surface roughness results of the CM.

FIG. 19 shows Table S2 depicting steam generation performance of the CM evaporator compared with other designs in previously published literature.

DETAILED DESCRIPTION

Interfacial solar steam generation is emerging as a promising technique for efficient desalination. Although increasing efforts have been made, challenges exist for achieving a balance among a plethora of performance indicators, e.g., rapid evaporation, durability, low-cost deployment, and salt rejection. A manure-based evaporator in accordance with one or more embodiments can convert 98% of sunlight into heat, and the strong capillarity of porous carbon fibers networks pumps sufficient water to evaporation interfaces. Salt diffusion within microchannels enables quick salt drainage to the bulk seawater to inhibit salt accumulation. With these advantages, this biomass-derived evaporator features a high evaporation rate of 2.81 kg m$^{-2}$ h$^{-1}$ under 1 sun with broad robustness to acidity and alkalinity. These advantages, together with facial deployment, offer an approach for converting farm waste to energy with high efficiency and easy implementation, which is particularly well suited for developing regions.

Fabrication and Working Mechanism of the CM

Figure 1A:
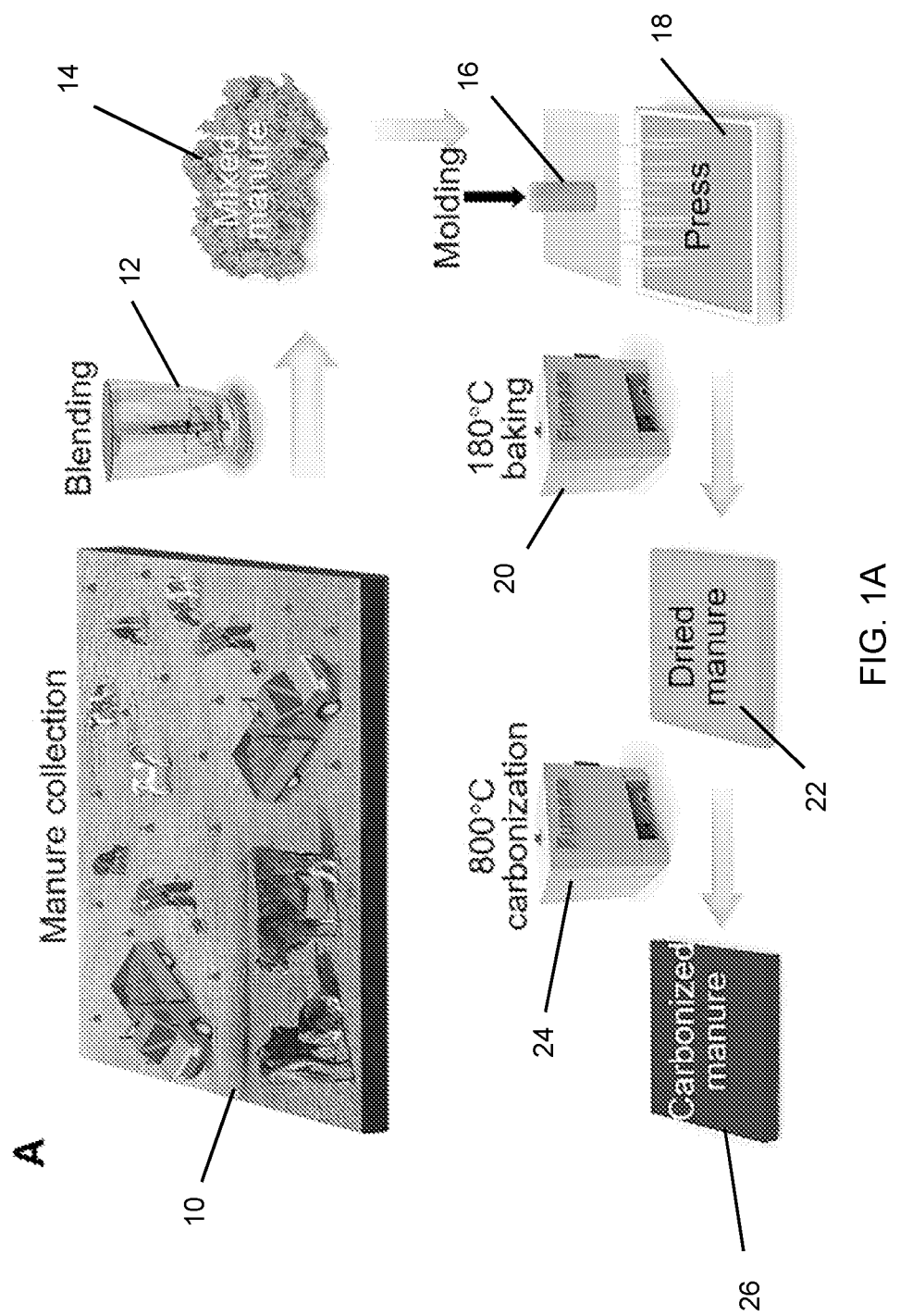
FIG. 1A illustrates an exemplary fabrication process of a CM evaporator in accordance with one or more embodiments.
Figure 6:
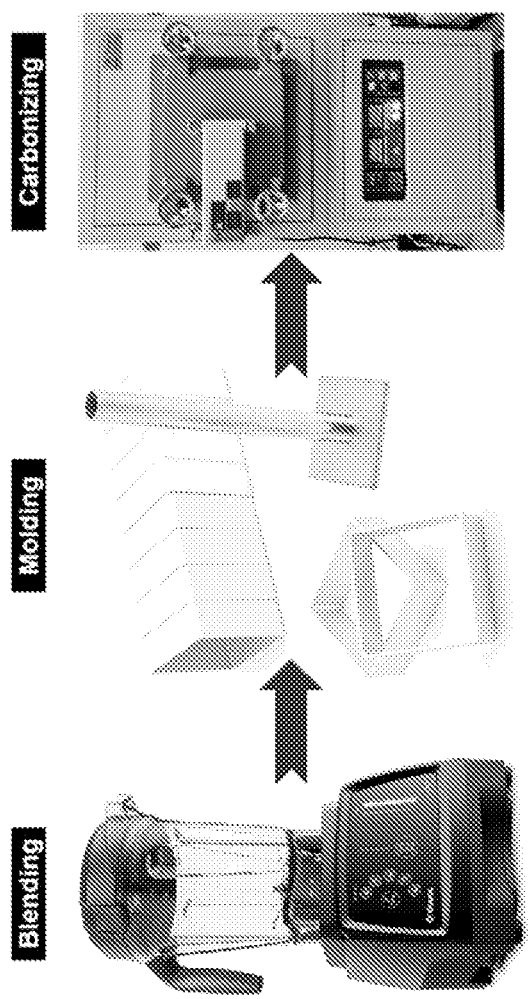
FIG. 6 shows examples of fabrication tools and processes that can be used to fabricated CM for solar desalination in accordance with one or more embodiments.

FIG. 1A depicts an exemplary process of fabricating a manure-based evaporator in accordance with one or more embodiments. The process includes the following steps: collecting, blending, molding, baking, and calcining. Manure collected at step 10 is blended at step 12 to turn large manure chunks into smaller pieces 14. A molding step 16 molds the manure pieces 14 into a bulk form (e.g., a slab) 18. A baking process 20 is used to bake the slab 18 to dehydrate the manure into dried manure 22. A carbonization process 24 transforms the dried manure 22 into porous CM 26 with a high specific surface area (FIGS. 1A and 6).

Figure 1C:
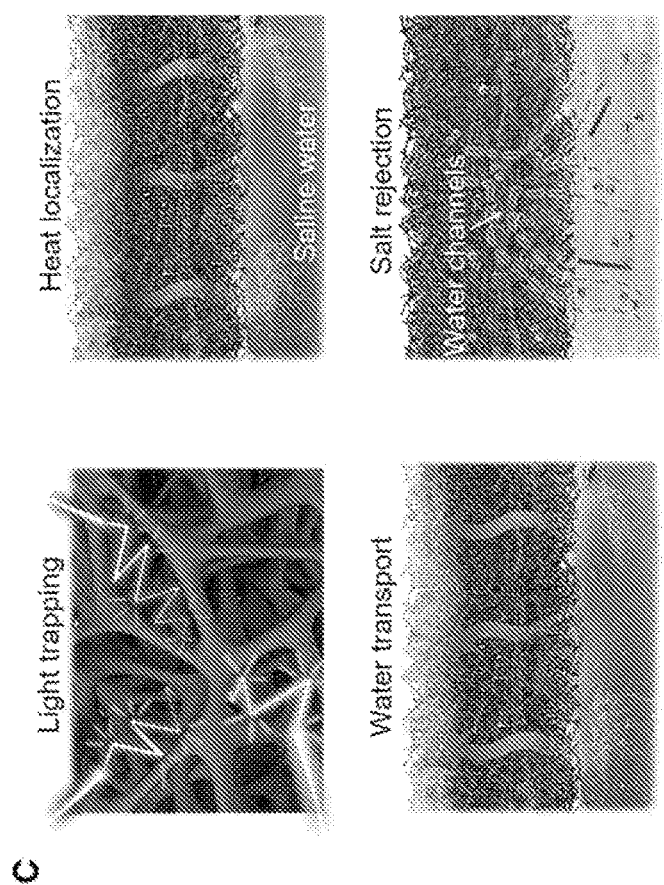
FIG. 1C schematically illustrates the light-absorption mechanism of the CM evaporator in accordance with one or more embodiments. The figure shows microchannels acting as a "blackcavity," which traps the incident light (top left), low thermal conductivity of the microporous CM enabling heat localization for a quick interfacial steam generation (top right); randomly arranged black carbon fibers forming microchannels to pump the seawater (bottom left); and salt dissipation driven by the salt concentration gradient between the top and bottom regions of the CM evaporator (bottom right).
Figure 1B:
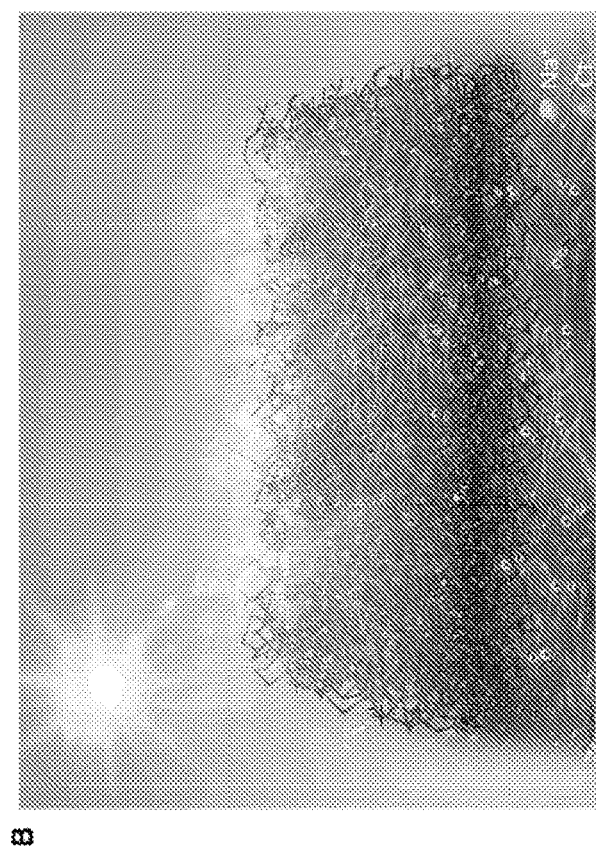
FIG. 1B schematically illustrates operation of an exemplary CM evaporator in accordance with one or more embodiments, showing interconnected open microchannels serving as water transport channels that pump seawater, and an ultra-black CM surface functioning as a photon-to-thermal layer to transform solar energy to heat.
Figure 1D:
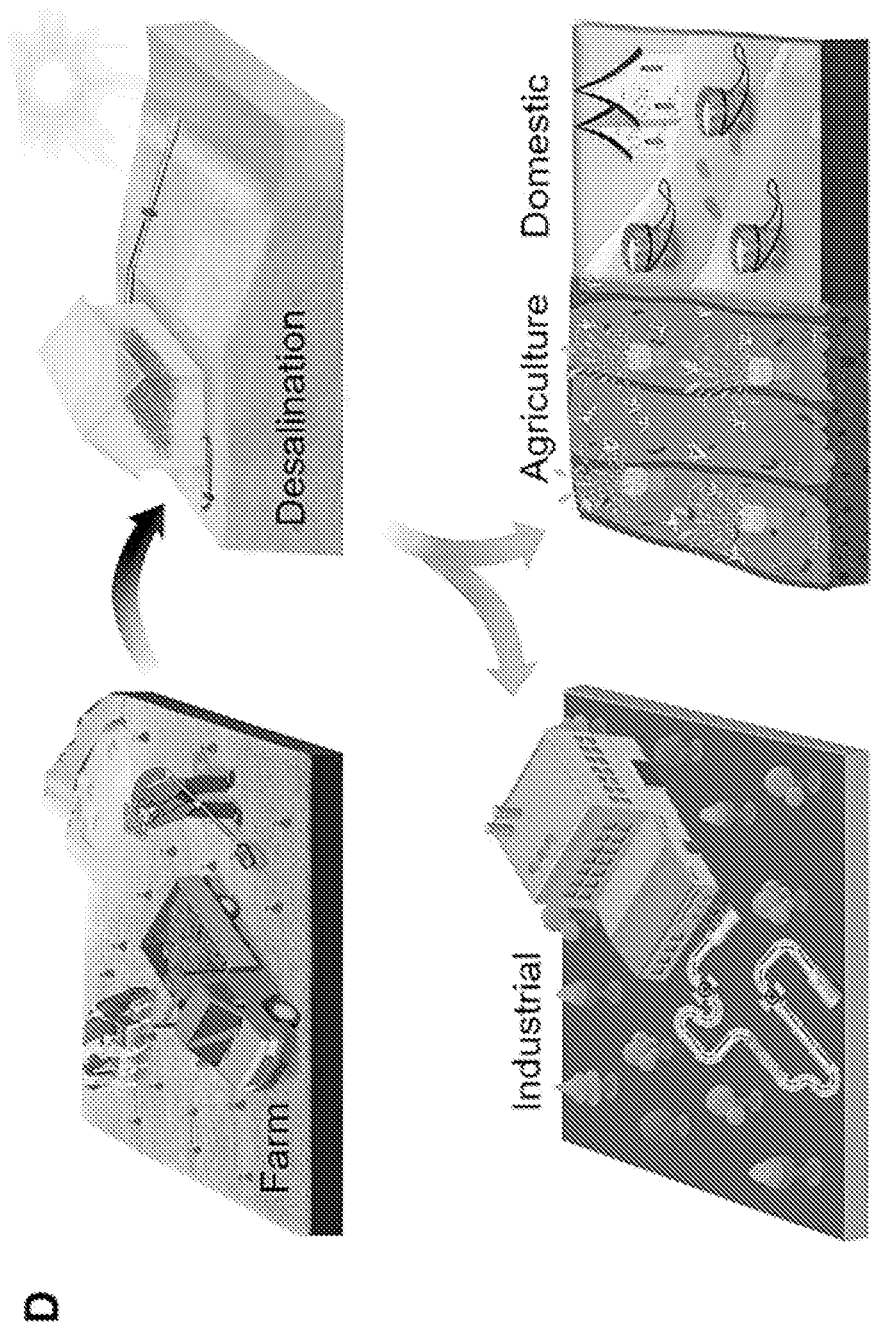
FIG. 1D schematically illustrates CM evaporators in accordance with one or more embodiments used in large-scale solar desalination with treated water used for industrial, agricultural, and domestic purposes.

This process dramatically enhances the light absorption of the CM, as illustrated in FIG. 1B. Seawater is pumped by capillary action to the top evaporation surface and is heated interfacially by the localized thermal energy, converted from the trapped sunlight by the coarse black CM. The salt is drained to the microchannels due to ion concentration gradients between the evaporation interface and microchannel arrays. Heat is localized within the small volume beneath the evaporation interface, inhibiting thermal diffusion to the bulk water. FIG. 1C elaborates these principles. The top CM surface is effective in light absorption as a result of trapped incident sunlight undergoing multiple reflections and interactions with matter (see FIG. 1C, top left). The photothermal energy is primarily confined near the very top evaporation layers, which are poorly thermal conductive (see FIG. 1C, top right). Strong capillary tensile force due to the superhydrophilic carbon fibers transports water flow to the upper interfacial evaporation layers, where continuous evaporation ensures the dynamic water supply (FIG. 1C, bottom left). The ion concentrations in the upper region are higher than those in the lower region. The salt exchange within microchannels driven by the salt concentration difference continuously transports excess salt away from the evaporation regions (FIG. 1C, bottom right). This prevents blockage of the water pathway and avoids undesirable sunlight reflections resulting from accumulated salt. To summarize, light absorption, interfacial evaporation, water pumping, and salt drainage work in concert to ensure uninterrupted interfacial evaporation and desalination. FIG. 1D schematically illustrates the concept of how the manure-derived photothermal evaporator benefits human, industrial, and agricultural activities. This process manifests the principles of sustainable development by converting biowaste materials into functional materials.

Materials Characterizations of the CM

Figures 2A, 2B, 2C:
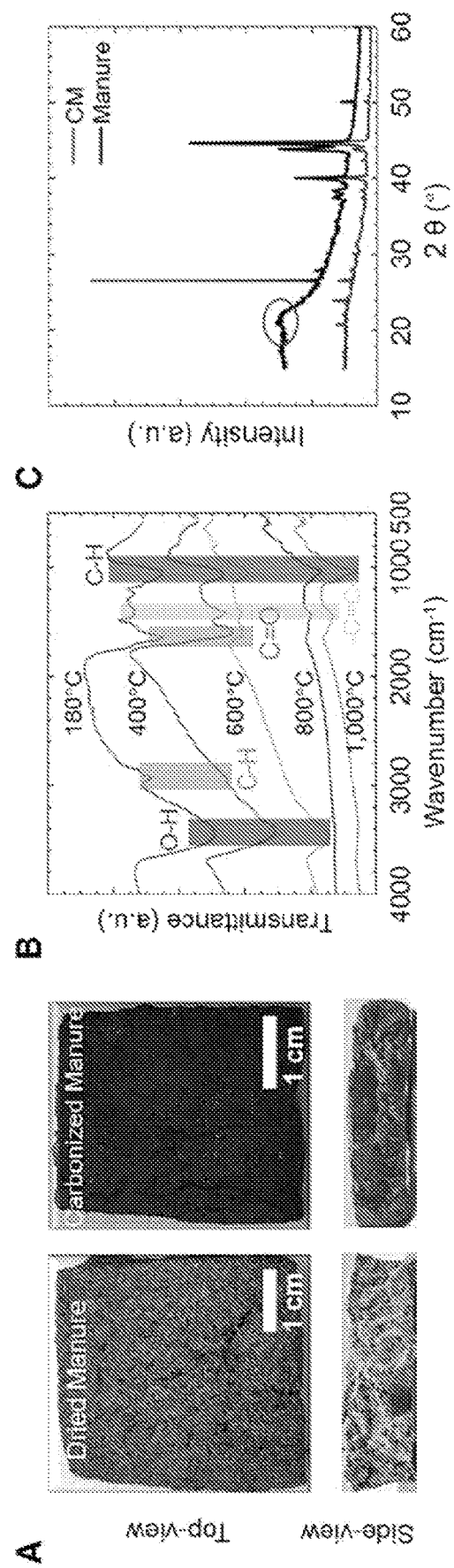
FIGS. 2A-2J show mechanical robustness, optical properties, and thermal conductivity characterization of CM evaporators in accordance with one or more embodiments.
Figures 2D, 2E, 2F:
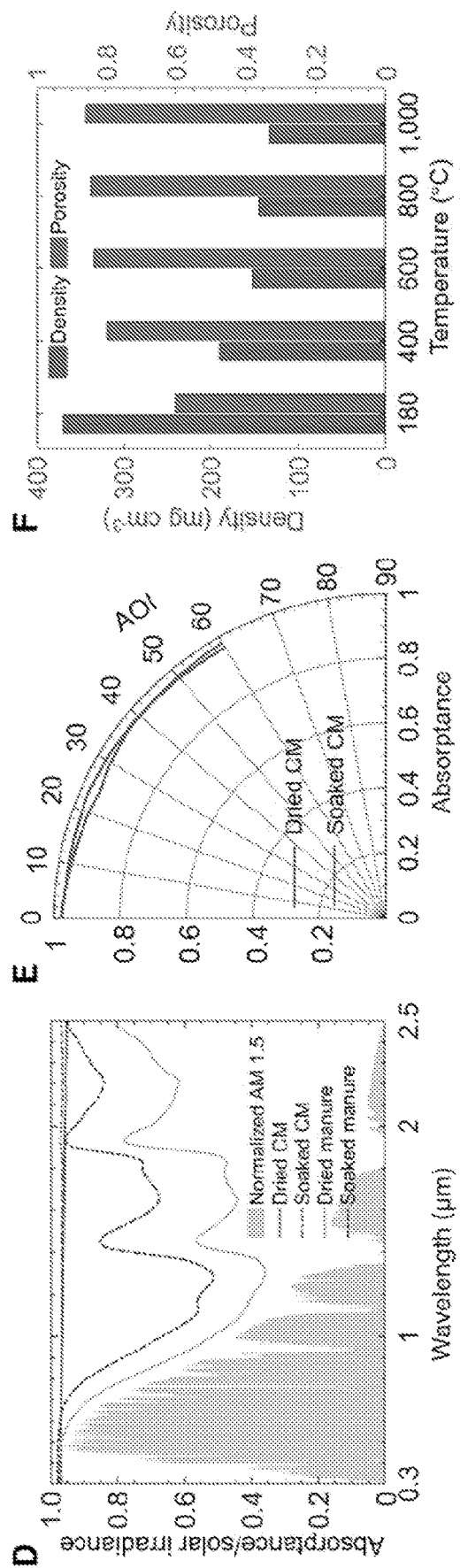
Figures 2G, 2H, 2I, 2J:
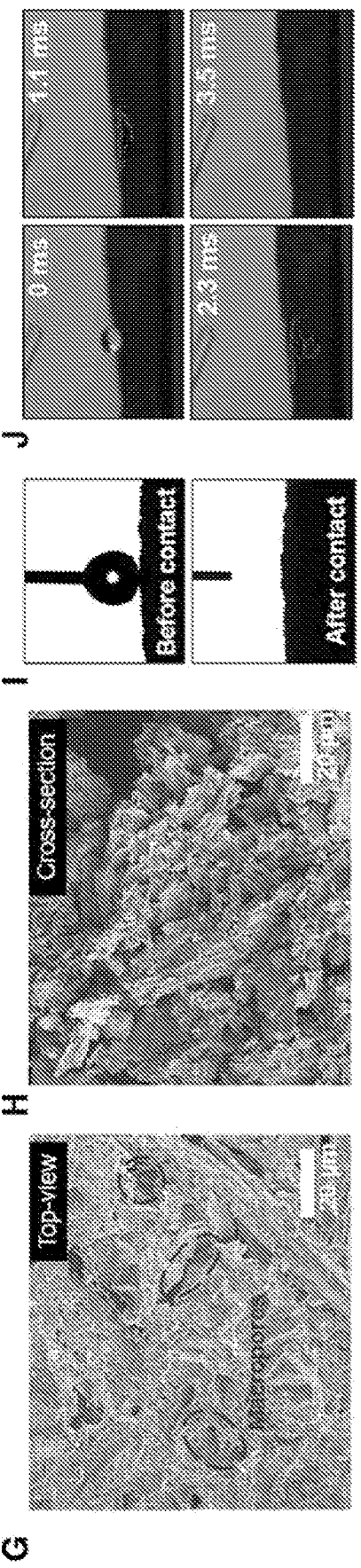
Figure 7:
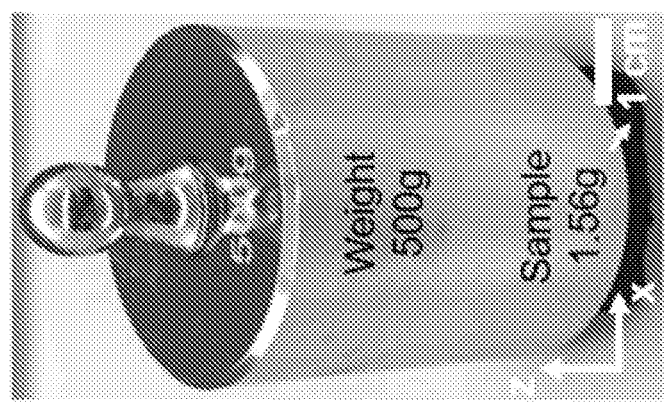
FIG. 7 is a photographs showing the mechanical strength of the CM.
Figure 8:
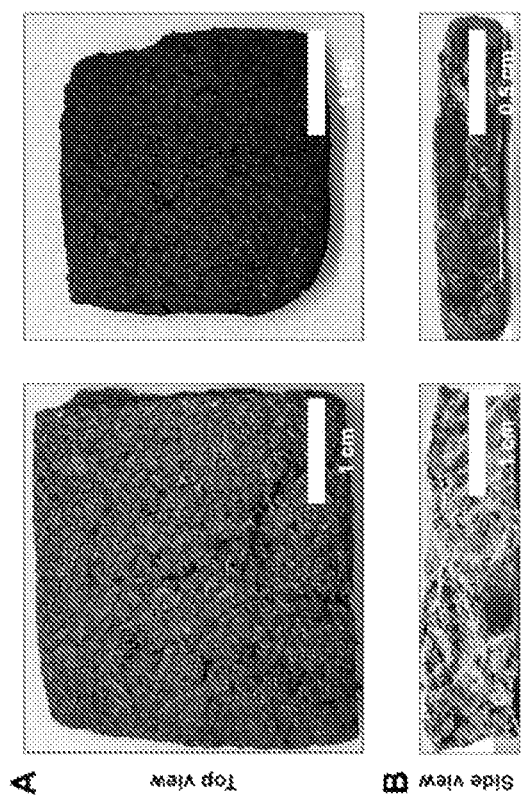
FIG. 8 shows optical properties of dried CM and soaked CM.
Figures 10A, 10B:
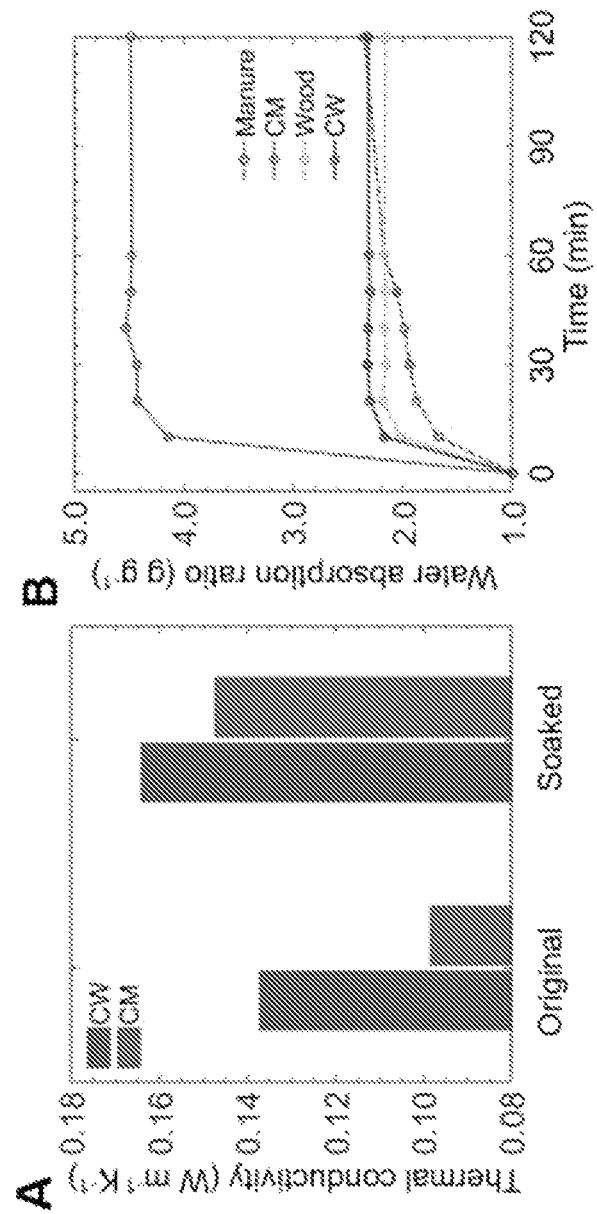
FIGS. 10A-10B are graphs showing the thermal conductivity and water absorption behavior.
Figure 11:
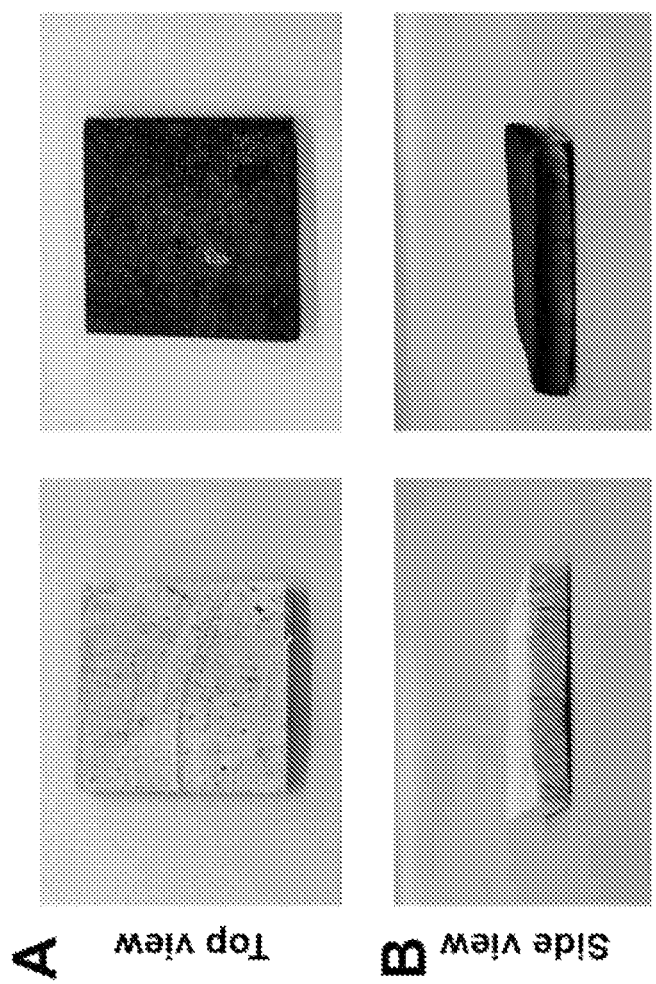
FIG. 11 has photographs showing top views and side views of the original wood and CW.

Dried manure shrinks in dimensions after carbonization under an Ar protection environment (FIG. 2A) and is mechanically stable (FIG. 7), withstanding >330 times its weight without deformation. As shown in FIG. 2B, we used Fourier transform infrared (FTIR) spectroscopy to identify the optimized carbonization temperature. At 800° C., the O—H stretching vibrations at 3,500 cm$^{-1}$ disappear. The decreasing peak intensity for the C—H bond at 2,920 cm$^{-1}$ and the C=O bond at 1,645 cm$^{-1}$ demonstrate the removal of cellulose/hemicellulose above 600° C. The —C=C— bond contributes to the light absorption after full carbonization. Conclusively, the optimized carbonization temperature is fixed at 800° C. As shown in FIG. 2C, the X-ray diffraction pattern has a broad peak (circled, in 20°-25°) from the raw manure, which vanishes in CM treated at 800° C. because of the carbonization of cellulose into carbon. The broad-spectrum absorption of CM is demonstrated by the solar absorptance spectra of dried CM and water-soaked CM, as shown in FIGS. 2D and 8. They show a solar absorptance of 0.98 across the solar wavelengths. This makes CM a nearly perfect solar absorber for harvesting solar energy. By contrast, the non-carbonized dried and soaked manure has a low solar absorptance of 0.77 and 0.86, respectively (FIGS. 2D and 8). The solar absorptance of the CM approaches unity, attributed to the light trapping of carbonized fibers despite different carbonization temperatures (FIGS. 9A-9C). The porous structures of the CM evaporator elongate the optical path to enhance the solar absorptance. The incident sunlight is barely reflected due to the nanoscale light trapping after multireflection and scatteration of the carbon fiber networks. The large difference in solar absorptance between uncarbonized manure and CM is mainly attributed to the high extinction coefficient of carbon compared with the negligible extinction coefficient of cellulose. Moreover, the solar absorptance is enhanced by scattering effects when carbon fibers are at the nanoscopic length scale. Furthermore, the solar absorptance of either dried or soaked CM is angle independent even at a high oblique angle (600), indicating that it can efficiently absorb sunlight from all angles of incidence (FIG. 2E). This makes CM a promising photothermal absorber at any time of the day and any location on the Earth, rendering expensive solar tracking systems unnecessary. The porosity of the CM increases with elevated calcined temperatures, while its density decreases (FIG. 2F). In this case, more air macropores are introduced, leading to its low thermal conductivity of 0.09 W m$^{-1}$ K$^{-1}$ and 0.15 W m$^{-1}$ K$^{-1}$ for CM and soaked CM, respectively (FIGS. 10A-10B). This protects the absorbed heat from diffusing downward to the bulk water and localizes heat to the small interfacial evaporation region, thereby increasing evaporator photothermal efficiency. Compared to a carbonized wood (CW)-based evaporator consisting of balsawood (FIGS. 10A-10B and 11), CM has lower thermal conductivity than CW both with and without being water soaked. Top views and cross-sections of scanning electron microscopy (SEM) morphology for the manure carbonized at 8000 C is shown in FIGS. 2G and 2H, and the carbon fiber size distribution is shown in FIGS. 12A-12B. The macropores facilitate light trapping by increasing the reflections and scattering inside the pores (FIGS. 12A-12B), enabling a solar absorptance approaching unity. These pores also enhance the vapor escape. The cross-section of the CM shows water transport and salt-rejection channels formed by the cellulose fibers (FIG. 2H), facilitating continuously efficient evaporation. The water absorption ratio curve is shown in FIG. 10A-10B, elucidating the exceptional water-absorption capacity of CM as compared to CW. The water absorption ratio of CM reaches 4.5 g g$^{-1}$, which is 2 times that of the CW. The dynamic contact measurement also illustrates a water absorption ability, since the waterdrop disappears instantly after contact with the surface of the CM (FIG. 2I). The rapid water absorption of CM is also demonstrated by the high-speed images shown in FIG. 2J. The waterdrop stands only 1.1 ms after it falls on the CM surface and is soaked completely by the CM within 3.5 s. The mechanical robustness, broadband solar absorption, good heat localization, and rapid water absorption capability collaboratively render the CM an excellent evaporator for solar steam generation and desalination.

Photothermal Response of the CM Foam

The optothermal response of the CM is investigated with an IR camera. FIGS. 3A-3C shows the temperature distributions of the pure water, the dried CM, and the CM with sufficient water supply under 1 sun irradiance. The surface temperature of the dried CM rises rapidly to 83.2° C. in the first 15 min and then stabilizes at 95.3° C. after 30 min, demonstrating its fast optothermal response. For the CM with a sufficient water supply, its temperature quickly goes up to 44.5° C. and reaches a final stable temperature of 48.3° C. The fast photothermal capability shortens the warmup time of the evaporation systems. The regions with the highest temperatures are confined in the very top surface of the CM in FIG. 3B, and the average temperature of water increases from 27.8° C. to 32.5° C., with a difference of the only 4.7° C. from 1 to 30 min in FIG. 3C. However, the pure water temperature rises from 19.6° C. to 29.9° C., with a difference of 10.3° C. (FIG. 3A), which proves that heat is localized on the top evaporation regions of the CM. The homogeneous temperature distribution of the pure water is in contrast with the confined high-temperature region only on the top of the CM evaporator, demonstrating the heat localization capability of the CM evaporator. The side view of the CM evaporator with the water supply shows that the high-temperature region of CM evaporator is confined at the very top layer (FIG. 13). For real outdoor applications, a rapid photothermal response and heat localization will dramatically boost the daily clean water yield. We further investigate the temperature evolutions of the CM evaporator with a sufficient water supply under various solar intensities, as shown in FIGS. 3D and 3E. The stagnation temperature of the CM evaporator surface reaches up to 87° C. under the illumination of 10 suns, which is high enough to quickly evaporate water. Steam is seen when the CM evaporator is irradiated by 5 suns, and it still yields a stagnation temperature of 31.6° C. under weak solar irradiance (0.5 kW m$^{-2}$), indicating its potential for working under sunlight after the sunrise and before the sunset.

Solar-Driven Steam-Generation Performance of the CM Foam

Figures 4G, 4H, 4I:
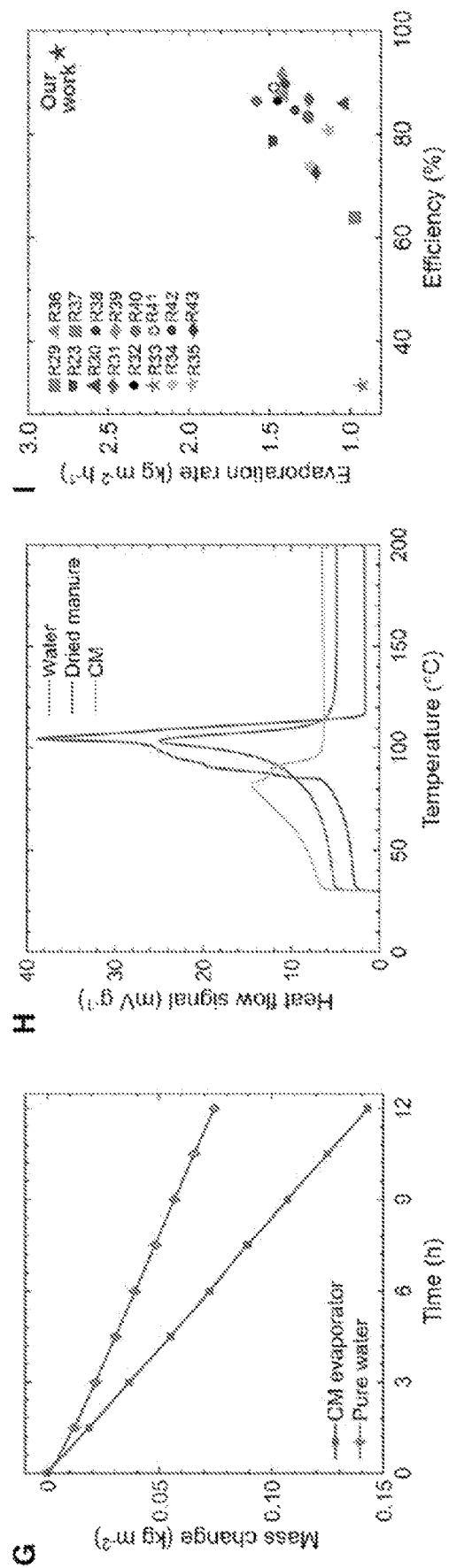
Figure 14:
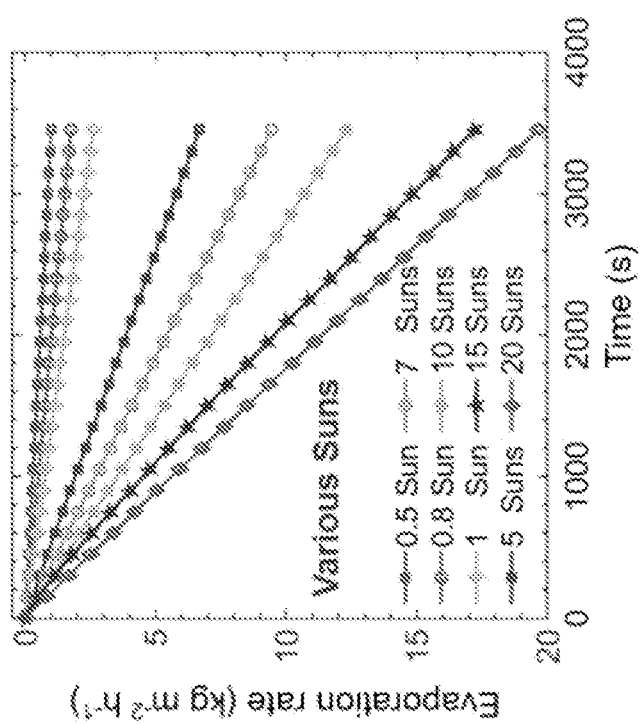
FIG. 14 is a graphs showing mass changes of water CM evaporator under various Suns.

The solar-driven evaporation rate of our CM evaporator is characterized by monitoring the mass difference of water in a plastic container (FIGS. 4A and 4B). The various solar intensities are realized by changing the optical concentration factors. The room temperature is about 21.3° C. and the relative humidity fluctuates at about 35%. The dimensions of the CM are fixed at 28 mm×30 mm×5 mm, and its sides are surrounded by polyethylene foam to simultaneously prevent the vapor escaping from the sides and to localize heat to the CM evaporator. The CM is put on a layer of cotton wipes with a thickness of 0.5 mm, and another end of the cotton wipes is soaked within the bulk water through a slit on the polyvinyl chloride (PVC) foam. The PVC foam holds the CM and cotton wipes over the bulk water. The working mechanism of the evaporator is shown in FIG. 4A. The broad-spectrum photothermal conversion and heat localization successfully converts and confines the solar thermal energy in the evaporation regions. The sufficient water absorption of the cotton wipes and CM continuously pump water to the top evaporation surfaces. Precipitated salt diffuses along the water transportation channels of CM and the cotton wipes downward into the bulk water. FIG. 4B shows the quick steam generation of CM evaporator under 5 suns. The mass changes of pure water, CW evaporator, dried manure, and CM evaporator under 1 sun irradiance are shown in FIG. 4C. The evaporation rate of the CM evaporator is 2.81 kg m$^{-2}$ h$^{-1}$, which outperforms the dried manure (1.44 kg m$^{-2}$ h$^{-1}$) and CW- (1.97 kg m$^{-2}$ h$^{-1}$) based evaporator and is 4.2 times that of the pure water (0.67 kg m$^{-2}$ h$^{-1}$). A continuous test for 16 h yields an average evaporation rate of 2.73 kg m$^{-2}$ h$^{-1}$ and an average photothermal efficiency of 91.4% under 1 sun, evaluating the performance of longtime evaporation stability (FIG. 4D). The evaporation capabilities of the CM evaporator under various solar illumination values are investigated (FIGS. 4E and 14). Enhanced solar intensities result in boosted evaporation rates, and the CM evaporator is demonstrated to have an evaporation rate of 20.45 kg m$^{-2}$ h$^{-1}$ under 20 suns. The evaporation rate under high concentration solar irradiance is below the linear estimated trends: the linear estimated evaporation rate should be 56 kg m$^{-2}$ h$^{-1}$, while the measured result is 20.45 kg m$^{-2}$ h$^{-1}$ (FIG. 4E). This discrepancy is due to the ultra-fast evaporation being larger than the water transport rate to the top evaporation surface. As discussed above, the evaporation rate of the CM evaporator (2.81 kg m$^{-2}$ h$^{-1}$) is larger than the theoretical limit (1.60 kg m$^{-2}$ h$^{-1}$, 1 kW m$^{-2}$). This mainly comes from the rough evaporation surface, resulting from the shrinkage of manure, which occurs during the high-temperature carbonization. This significantly expands the areas in which water evaporation takes place. To visualize the expanded areas of the CM surface, optical profilometry is applied to characterize the surface topography of CM, as shown in FIG. 4F. The projection area of solar irradiation remains the same regardless of what the surface topography of the CM evaporator is. This effect is much like the 3D solar interfacial device that enhances the evaporation rate by increasing the evaporation area of the evaporator along the vertical direction. The average roughness of the CM surface is 71 mm, with a maximum peak height of 1,201 mm and a maximum valley depth of 1,666 mm (see Table S1 shown in FIG. 18 for details). The bumpy surface of the CM increases the evaporation area and thereby contributes to the rapid evaporation rate of the CM. To validate this, we evaluate the evaporation of CM in a dark environment continuously for 12 h, eliminating sunlight effects, as shown in FIG. 4G. The evaporation rate of the CM evaporator (0.142 kg m$^{-2}$ h$^{-1}$) is 2.02 times that of pure water (0.07 kg m$^{-2}$ h$^{-1}$) in a dark environment, which validates the idea that the evaporation area of the CM is larger than that of the pure water. The enhanced evaporation rate of CM is attributed to the expanded evaporation surface, as shown in the surface topographies measured by the optical profilometry since there are no components in CM with chemical groups of —OH, —NH2, and —COOH that can activate water molecules. The enlarged evaporation surfaces can also be considered a reduced evaporation enthalpy of water, and the equivalent vaporization enthalpy of CM is 1,276 kJ kg$^{-1}$ (see supplemental notes below for further details), which is much smaller than the theoretical value (2,453.5 kJ kg$^{-1}$ at 20° C.). Differential scanning calorimetric (DSC) characterization shows the reduced evaporation enthalpy of water in CM. A sharp signal peak is observed at 100° C. and then decreases dramatically, indicating that the water evaporates immediately and completely (FIG. 4H). For the dried manure soaked with water, the heat flow signal peak is lower than that of the pure water, meaning that the dried manure has a large specific evaporation surface. The peaks of CM soaked with water are broader than those of pure water and dried manure. This demonstrates that the evaporation enthalpy of water in CM is reduced because the specific evaporation area of CM is expanded by the carbonization process. FIG. 4I and Table S2 shown in FIG. 19 show a detailed comparison of evaporation rate and photothermal efficiency for the CM evaporator with other previously reported devices with 2D and 3D evaporator structures. It is worth noting that for a 2D photothermal evaporator, this means the evaporation surface (i.e., the surface for water vapor generating and escaping) spreads in x- and y-directions, while a 3D photothermal evaporator owns an evaporation surface in x-, y-, and z-directions. Regarding the CM photothermal evaporator proposed in this study, its evaporation surface during the experiments spreads only in the x- and y-directions, and we have also enclosed its sidewall using the polyethylene foam to prevent vapor from escaping from the sidewall surfaces, as shown in FIG. 4B. We recognize that almost all of the solar evaporators can be classified into the 3D structures if viewed from a microscopic perspective since top surfaces are not smooth while zooming in to nanoscale. Therefore, we consider our CM photothermal evaporator to be a 2D structure because it does not have an evaporation surface in the z-direction. Both the evaporation rate and photothermal efficiency of our CM evaporator top this collection of data. With the advantages of cost-effectiveness and scalable fabrication, our CM evaporator can easily be applied to large-scale applications, especially for underdeveloped areas when considering the abundant raw materials resources and straightforward fabrication process.

Solar Desalination, Salt-Rejection, and Recycling Performance of the CM Foam

Figure 5A:
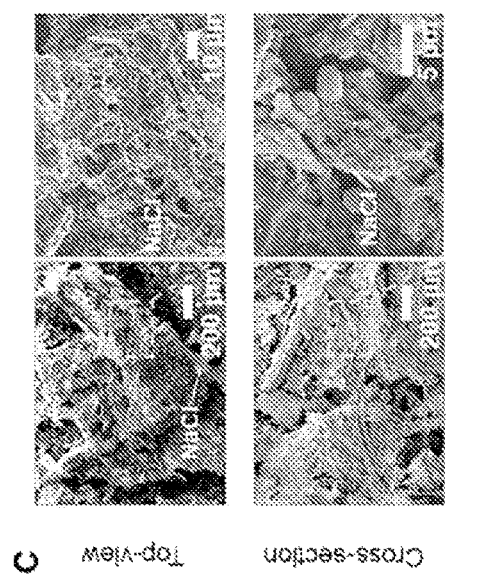
Figure 5B:
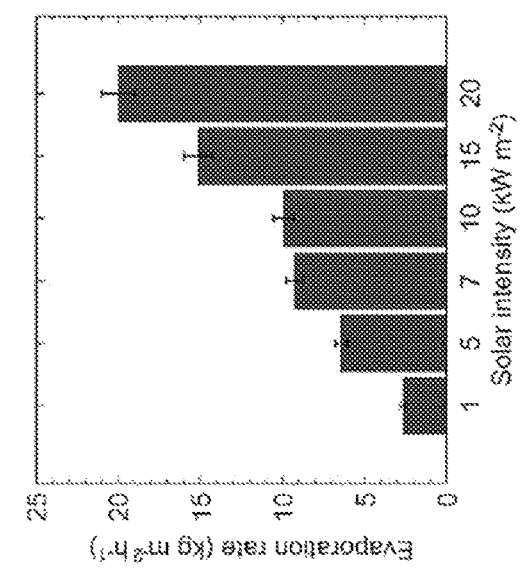
Figure 5C:
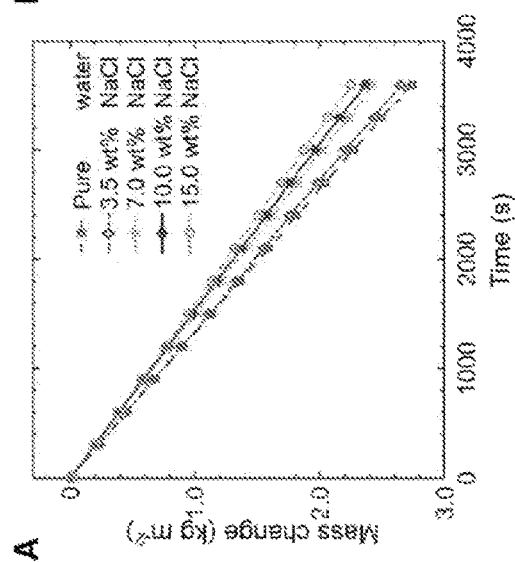
Figure 5H:
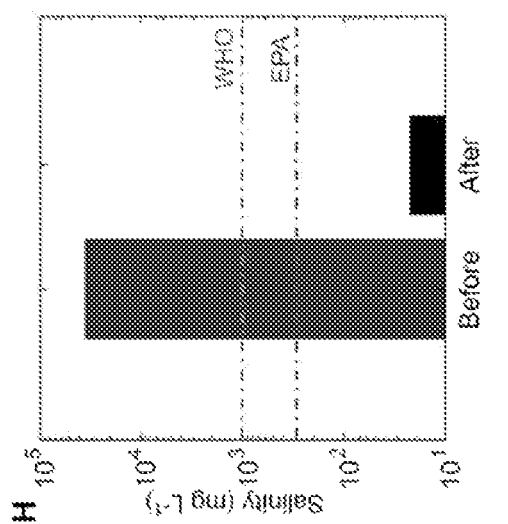
Figure 5I:
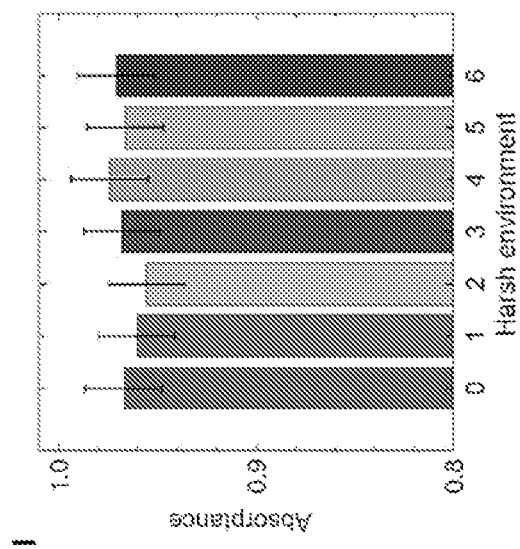
Figure 5J:
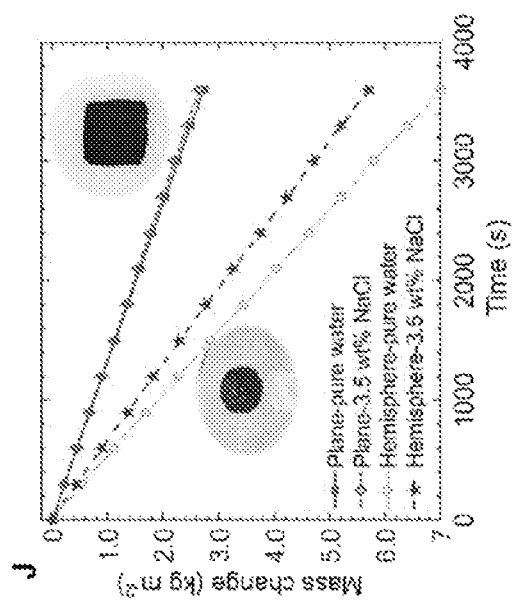
Figure 15:
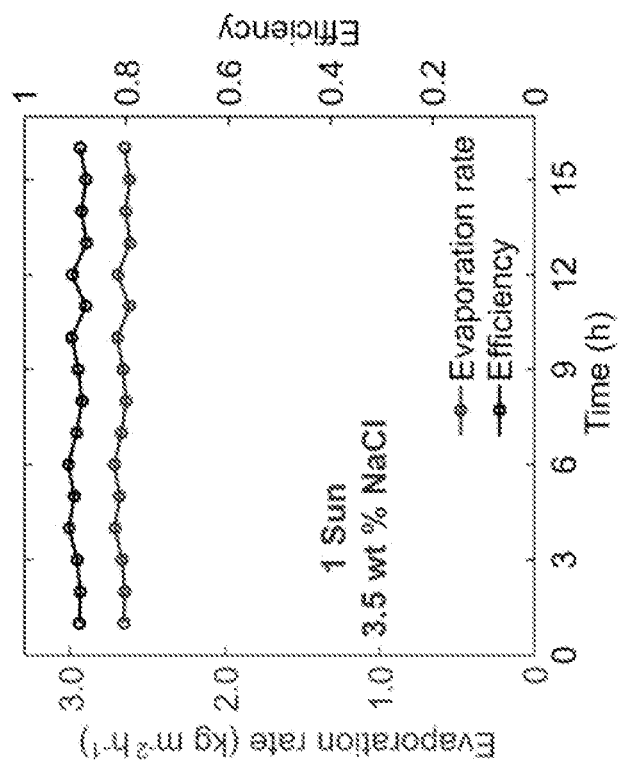
FIG. 15 is a graphs showing long-time evaporation rate and efficiency. Evaporation rate and efficiency of the CM evaporator under 1 Sun for different cycles with 3.5 wt % NaCl solution.
Figure 16:
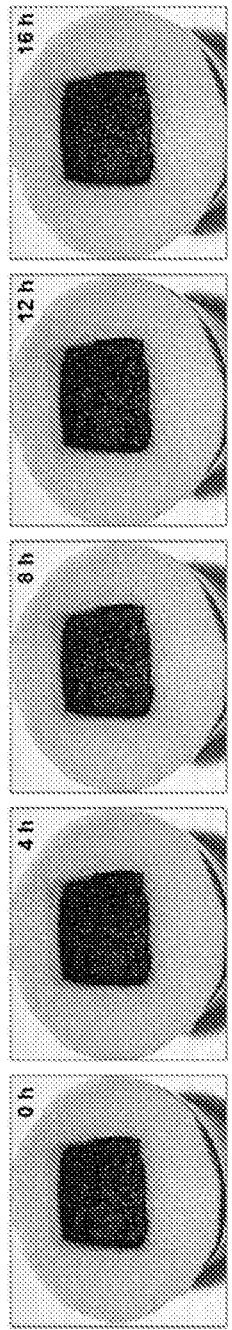
FIG. 16 shows photographs of a CM evaporator after working continuously for 16 hours under 1 Sun showing no salt accumulation indicating its excellent salt rejection capabilities.
Figure 17:
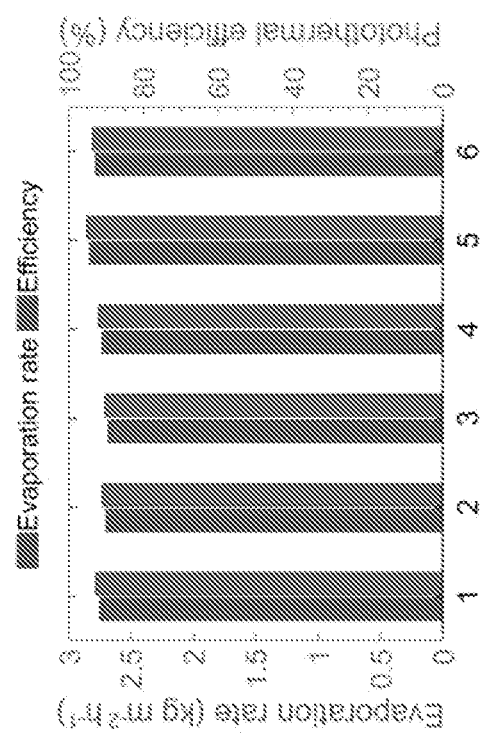
FIG. 17 is a graph showing the evaporation rate and photothermal efficiency of a CM evaporator after treatment under various harsh environments.

Salt-rejection capabilities and robustness in harsh environments are essential for solar-driven desalination. Salt accumulated in the water channels severely hinders water pumping, subsequent salt drainage, and light absorption, which dramatically decreases the evaporation rate to as low as zero. It is therefore essential to limit salt accumulation by using evaporator materials with excellent salt-rejection capabilities, particularly for applications involving high-salinity solutions. No salt accumulation occurs even using the 15 wt % NaCl solutions under 1 kW m$^{-2}$ irradiance during the experiment. The evaporation rate of the CM decreases from 2.81 kg m$^{-2}$ h$^{-1}$ for pure water to 2.25 kg m$^{-2}$ h$^{-1}$ for the 15 wt % NaCl solution (FIG. 5A). An evaporation rate of 20 kg m$^{-2}$ h$^{-1}$ under 20 suns irradiation is demonstrated, while the top surface of CM evaporator shows no salt accumulation, indicating its robustness for working in high-salinity (15 wt % NaCl solution, FIG. 5A) environments and under high solar intensities (20 kW m$^{-2}$, FIG. 5B). An average photothermal efficiency of 89% is achieved for the continuous 16-h solar desalination experiment using the 3.5 wt % NaCl solution (FIG. 15). FIG. 5C shows SEM images of the top view and cross-section of the CM after working for 6 h under 10 suns in the 3.5 wt % NaCl solution. The salt crystallizes on the surface of the carbon fibers, but the water microchannels for water supply and salt rejection persist for continuous desalination. Time-lapse images of the salt-rejection experiment (FIG. 5D) show that 7 g NaCl (average particle size: 10 mm in diameter) diffuses into the bulk NaCl solution (3.5 wt %) within 3.75 h, validating the exceptional salt-drainage capability of CM. There is no salt accumulation on the top of the CM evaporator during the 16-h desalination experiments (FIG. 16). The robust cycling performance of the CM evaporator in a high-salinity solution (15 wt % NaCl) is stable. By immersing the CM evaporator in a 15-wt % NaCl for certain days, such as 1, 3, 5, 7, 14, 21, 28, and 30 days, then taking it out for the evaporation rate tests using the 3.5 wt % NaCl solution each time. The CM evaporator yields an average evaporation rate of 2.65 kg m$^{-2}$ h$^{-1}$ (3.5 wt % NaCl solutions) for 28 days (with a total immersion time of CM=720 h (FIG. 5E). No degradation of the evaporation rate is observed. The recyclability of the evaporator is another key point for extending its lifetime for sustainable development. The mass changes of the original and recycled CM evaporator are nearly identical under 1 sun illumination, which validates the effectiveness of the recycled CM. The recyclability of CM indicates that the lifetime of the CM evaporator can be essentially infinite (FIG. 5F). The FTIR transmittance spectra of the CM and the recycled CM also illustrate their consistency in spectra properties (FIG. 5G), validating that the components of the evaporator do not change after being recycled. The absorption peak at 3,400 cm$^{-1}$ stems from the O—H stretching vibration, and peaks at 1,400-1,650 cm$^{-1}$ come from the C=O and C=C bonds. The peak at 1,030 cm$^{-1}$ results from the C—H deformation vibrations. To demonstrate the water quality after desalination, seawater collected from Revere Beach, near Boston, Massachusetts, is used to track the quality of produced water. After desalination, the salinity of purified water significantly decreases by 4 orders of magnitude, and it is 2 orders of magnitude below the freshwater standards defined by the World Health Organization (1%) and the US Environmental Protection Agency (0.5%) (FIG. 5H). The overall solar absorptance, evaporation rate, and photothermal efficiency of the CM evaporator after treatments in various harsh environments are shown in FIGS. 5I and 17. These data demonstrate that the CM evaporator is also physically and chemically robust in the presence of acidic and alkaline solutions, high-temperature water (95° C.), ultrasonic vibrations, longtime immersion in high-salinity water, and high illumination of 10 suns for 6 h. The evaporation rate of 3D evaporators with spatial structures has an outstanding performance that far exceeds the theoretical limit of the 2D structure due to the expanded evaporation area and the utilization of side areas that obtain energy from the ambient surroundings. To extend the application of the CM evaporator, a hemispherical CM evaporator is fabricated and characterized to show its excellent performance as a 3D structure. The hemispherical CM evaporator achieves an evaporation rate of 7.00 kg m$^{-2}$ h$^{-1}$ in the pure water and 5.70 kg m$^{-2}$ h$^{-1}$ in the 3.5 wt % NaCl solutions under 1 sun. The enhanced 3D structural CM evaporator shows promise for scalable implementations with low-cost deployment and easy fabrication methods.

The solar thermal evaporator derived from carbonized manure disclosed herein is cost-effective and eco-friendly. The system features an evaporation rate of 2.81 kg m$^{-2}$ h$^{-1}$ and a photothermal efficiency of 94.7% under 1 sun, outperforming most reported solar evaporators on a cost basis ($1.32 m$^{-2}$ electricity usage and vanishing raw material cost). A hemispherical 3D spatial structure composed of CM yields a high evaporation rate of 7.00 kg m$^{-2}$ h$^{-1}$ with pure water and 5.70 kg m$^{-2}$ h$^{-1}$ with 3.5 wt % NaCl solutions under 1 sun. The porous CM microstructure enhances internal light scattering and multireflection, enabling effective light trapping and photothermal conversion. Microstructures of CM contribute to the low thermal conductivity and heat localization within the water evaporation interface. The interconnected microchannels and superhydrophilic carbonized fibers assist in fast capillary water transportation. Continuous clean water production in a high-salinity brine (15 wt %) is made possible by the effect of diffusion and convection inside channels that prevent salt accumulation. Furthermore, the chemical and physical robustness of the evaporator makes it durable, and the simplicity in the fabrication process and material choices benefits large-scale and low-cost manufacturing. This biomass solar evaporator can generate clean water cost-effectively and efficiently from a wide variety of water sources, ranging from high-salinity brine to sewage.

Experimental Procedures

Materials

The cotton wipe used as the water path was supplied by Webril. The PVC insulation foam was purchased from McMaster-Carr. NaCl (99.0%) was supplied by Sigma-Aldrich. The fresh manure was collected from Blackbird Farm, Smithfield, RI, USA.

Sample Preparations

The CM evaporator was fabricated as follows: the fresh manure was crushed into small pieces using a high-speed blender for 3 min and molded into a cuboid (5 cm×5 cm×0.5 cm). The manure cuboid was dried at 180° C. for 20 min and carbonized in an Ar environment for 1 h. A 7-mm-thick PVC foam was cut into a circle with a diameter of 4.5 cm. The cotton wipes were cut into pieces with a dimension of 5 cm×3 cm and soaked in the water through a slit in the PVC foam; then, the CM was placed on the cotton wipe. After using the CM photothermal evaporator for 15 h, we blended it with fresh manure using the blender and followed the molding and carbonization processes as listed above to fabricate a recycled CM photothermal evaporator. The hemispherical CM was fabricated by molding the fresh manure within a hemisphere and then followed by the carbonization process.

Solar Desalination Experiments

Solar desalination experiments were conducted under various solar fluxes using the solar simulator with a Fresnel lens to change the solar intensity. The mass of water was accurately monitored by an electrical scale (RADWAG, PS 1000) with a resolution of 0.001 g.

Materials Characterization

The reflectance spectra (0.3-2.5 mm) were measured by a Jasco V770 spectrophotometer equipped with a Jasco ISN-923 integrating sphere. The incident angle of the light beam was fixed at an angle of 6°. The FTIR transmittance spectra were measured by a Jasco FTIR 6600. The reflectance spectra at different angles of incidence (AOI) were characterized by using wedges of different angles at the sample port of the Jasco V770 spectrophotometer [44]. The surface morphologies of samples were characterized by an acceleration voltage of 3 kV. The DSC thermograms were measured by a TA Instruments DSC Q200 with a heating rate of 5° C. from 25° C. to 200° C. under an airflow flux of 50 mL min$^{-1}$. IR images of samples were taken using the FLIR A655C thermal camera at a resolution of 640 3 480 with a 25° lens. The thermal conductivity of samples was characterized by the Hot Disk TPS 2500s. The contact angle was characterized by a SINDIN SDC-350 contact angle meter. The X-ray diffraction (XRD) spectra were characterized by the Bruker D8 X-ray Diffractometer, scanning from 150 to 1000 with a step size of 0.02°. High-speed images were recorded by the Chronos 2.1-HD. The optical profilometry images were collected using a Bruker ContourGT-X8 optical profilometer. The solar intensity of the solar simulator was calibrated by the TES 132 solar power meter for each experiment under 0.5, 0.8, and 1 kW m$^{-2}$. For the experiments under 5, 7, 10, 15, and 20 kW m$^{-2}$, the solar intensity was calibrated by the OPHIR FL250A-BB35. The salinity of collected water samples was characterized by the Extech EC400 ExStik salinity meter. The pH value of the solutions was measured by the Dr. Meter pH-100 meter. Samples were imaged with a Zeiss Supra 40VP SEM after being coated with 10 nm platinum using a Leica MED 020 high-vacuum sputter coater.

Supplemental Information

Investigation of photothermal efficiency of the evaporation device.

The photothermal efficiency $\eta_{pt}$ of an absorber can be calculated using the equation $$\eta_{pt} = \dot{m} h_{fg}/Q_s,$$

where m is water evaporation rate, $h_{fg}$ is the vaporization enthalpy of the water in an absorber, and $Q_s$ refers to the power density of the incoming light illumination. However, according to the water cluster theory in Zhao et al.'s work, the vaporization enthalpy of water in the porous structure is smaller than that of pure bulk water (Nature nanotechnology, 2018, 13, 489-495). To get the equivalent vaporization enthalpy ($h_{fg}$) of water in the porous absorber in this study, the control experiment is conducted following the instruction of Zhao et al.'s work. Two 100 ml graduated polypropylene beakers are served as containers for the pure water and the CM evaporator. These two beakers are synchronously placed on a polystyrene (PS) foam avoiding heat loss and covered with a cardboard box creating a dark environment under the same ambient temperature and pressure. The mass change of water for these two groups is recorded for 12 h as shown in FIG. 4 F. The equivalent vaporization enthalpy $h_{fg}$ can be estimated using the following formula:

$$h_{fg} = \frac{\dot{m}_{water}}{\dot{m}_{CW}} h_{fg}^w$$

where $m_{water}$ is the evaporation rate of pure water, $h^w{}_{fg}$ is vaporization enthalpy of pure water, and $m_{cw}$ is the evaporation rate of the CM evaporator. The equivalent vaporization enthalpy $h_{fg}$ is 1276 kJ kg$^{-1}$, which is greatly reduced owing to the greatly increased effective evaporation surfaces at the top surface of the CM evaporator coming from its porous structure. To obtain the photothermal efficiency with the equivalent vaporization enthalpy $h_{fg}$, a solar illumination experiment with the same absorber layer is conducted (2.81 kg m$^{-2}$ h$^{-1}$) after finishing the dark environment experiments. Using the equivalent vaporization enthalpy $h_{fg}$ and the net evaporation rate (subtract the evaporation rate in the dark environment), the photothermal efficiency is calculated to be 94.7%. The photothermal efficiency of the CM evaporator working with the 3.5 wt % NaCl solution is calculated following the same procedure as listed above.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

REFERENCES

1. Guo, Y., Lu, H., Zhao, F., Zhou, X., Shi, W., and Yu, G. (2020). Biomass-derived hybrid hydrogel evaporators for cost-effective solar water purification. Adv. Mater. 32, e1907061.
2. Ni, G., Zandavi, S. H., Javid, S. M., Boriskina, S. V., Cooper, T. A., and Chen, G. (2018). A salt-rejecting floating solar still for low-cost desalination. Energy Environ. Sci. 11, 1510-1519.
3. Chen, G., Li, N., He, J., Qiao, L., Li, F., Wang, S., and Xu, X. (2020). Design of self-righting steam generators for solar-driven interfacial evaporation and self-powered water wave detection. J. Mater. Chem. A Mater. Energy Sustain. 8, 24664-24674.
4. Chen, G., Li, N., He, J., Qiao, L., Li, F., Wang, S., Yu, L., Murto, P., Li, X., and Xu, X. (2019). Interfacial solar-to-heat conversion for desalination. Adv. Energy Mater. 9, 1900310.
5. Malaeb, L., and Ayoub, G. M. (2011). Reverse osmosis technology for water treatment: state of the art review. Desalination 267, 1-8.
6. Khawaji, A. D., Kutubkhanah, I. K., and Wie, J. M. (2008). Advances in seawater desalination technologies. Desalination 221, 47-69.
7. Werber, J R., Osuji, C. O., and Elimelech, M. (2016). Materials for next-generation desalination and water purification membranes. Nat. Rev. Mater. 1, 1-15.
8. Zhu, L., Gao, M., Peh, C. K. N., and Ho, G. W. (2019). Recent progress in solar-driven interfacial water evaporation: advanced designs and applications. Nano Energy 57, 507-518.
9. Wang, J., Li, Y., Deng, L., Wei, N., Weng, Y., Dong, S., Qi, D., Qiu, J., Chen, X., and Wu, T. (2017). High-performance photothermal conversion of narrow-bandgap ti2o3 nanoparticles. Adv. Mater. 29, 1603730.
10. Ito, Y., Tanabe, Y., Han, J., Fujita, T., Tanigaki, K., and Chen, M. (2015). Multifunctional porous graphene for high-efficiency steam generation by heat localization. Adv. Mater. 27, 4302-4307.
11. Ma, S., Qarony, W., Hossain, M. I., Yip, C. T., and Tsang, Y. H. (2019). Metal-organic framework derived porous carbon of light trapping structures for efficient solar steam generation. Sol. Energy Mater. Sol. Cells 196, 36-42.
12. Shi, L., Shi, Y., Zhuo, S., Zhang, C., Aldrees, Y., Aleid, S., and Wang, P. (2019). Multi-functional 3d honeycomb ceramic plate for clean water production by heterogeneous photo-fenton reaction and solar-driven water evaporation. Nano Energy 60, 222-230.
13. Hong, S., Shi, Y., Li, R., Zhang, C., Jin, Y., and Wang, P. (2018). Nature-inspired, 3d origami solar steam generator toward near full utilization of solar energy. ACS Appl. Mater. Interfaces 10, 28517-28524.
14. Zhang, P., Li, J., Lv, L., Zhao, Y., and Qu, L. (2017). Vertically aligned graphene sheets membrane for highly efficient solar thermal generation of clean water. ACS Nano 11, 5087-5093.
15. Zhang, P., Liao, Q., Zhang, T., Cheng, H., Huang, Y., Yang, C., Li, C., Jiang, L., and Qu, L. (2018). High throughput of clean water excluding ions, organic media, and bacteria from defect-abundant graphene aerogel under sunlight. Nano Energy 46, 415-422.
16. Zhang, W., Chen, X., Zhang, G., Li, J., Ji, Q., Hu, C., Ren, Z. J., Liu, H., and Qu, J. (2020). A salt-rejecting anisotropic structure for efficient solar desalination via heat-mass flux decoupling. J. Mater. Chem. A Mater. Energy Sustain. 8, 12089-12096.
17. Chen, J., Yin, J. L., Li, B., Ye, Z., Liu, D., Ding, D., Qian, F., Myung, N. V., Zhang, Q., and Yin, Y. (2020). Janus evaporators with self-recovering hydrophobicity for salt-rejecting interfacial solar desalination. ACS Nano 14, 17419-17427.

18. Zhou, L., Tan, Y., Wang, J., Xu, W., Yuan, Y., Cai, W., Zhu, S., and Zhu, J. (2016). 3d self-assembly of aluminium nanoparticles for plasmon-enhanced solar desalination. Nat. Photonics 10, 393-398.
19. Hu, X., Xu, W., Zhou, L., Tan, Y., Wang, Y., Zhu, S., and Zhu, J. (2017). Tailoring graphene oxide-based aerogels for efficient solar steam generation under one sun. Adv. Mater. 29, 1604031.
20. Guo, Y., Zhao, X., Zhao, F., Jiao, Z., Zhou, X., and Yu, G. (2020). Tailoring surface wetting states for ultrafast solar-driven water evaporation. Energy Environ. Sci. 13, 2087-2095.
21. He, S., Chen, C., Kuang, Y., Mi, R., Liu, Y., Pei, Y., Kong, W., Gan, W., Xie, H., Hitz, E., et al. (2019). Nature-inspired salt resistant bimodal porous solar evaporator for efficient and stable water desalination. Energy Environ. Sci. 12, 1558-1567.
22. Liu, J., Liu, Q., Ma, D., Yuan, Y., Yao, J., Zhang, W., Su, H., Su, Y., Gu, J., and Zhang, D. (2019). Simultaneously achieving thermal insulation and rapid water transport in sugarcane stems for efficient solar steam generation. J. Mater. Chem. A Mater. Energy Sustain. 7, 9034-9039.
23. Xu, N., Hu, X., Xu, W., Li, X., Zhou, L., Zhu, S., and Zhu, J. (2017). Mushrooms as efficient solar steam-generation devices. Adv. Mater. 29, 1606762.
24. Regan, P. M., and Kim, H. (2020). Water scarcity, climate adaptation, and armed conflict: insights from Africa. Reg. Environ. Change 20, 1-14.
25. Fang, J., Liu, J., Gu, J., Liu, Q., Zhang, W., Su, H., and Zhang, D. (2018). Hierarchical porous carbonized lotus seedpods for highly efficient solar steam generation. Chem. Mater. 30, 6217-6221.
26. Geng, Y., Sun, W., Ying, P., Zheng, Y., Ding, J., Sun, K., Li, L., and Li, M. (2020). Bioinspired fractal design of waste biomass-derived solar-thermal materials for highly efficient solar evaporation. Adv. Funct. Mater. 31, 2170020.
27. Mulbry, W., Westhead, E. K., Pizarro, C., and Sikora, L. (2005). Recycling of manure nutrients: use of algal biomass from dairy manure treatment as a slow release fertilizer. Bioresour. Technol. 96, 451-458.
28. Mekonnen, A., and Köhlin, G. (2008). Biomass fuel consumption and dung use as manure: evidence from rural households in the Amhara region of Ethiopia. https://media.rff.org/archive/files/sharepoint/WorkImages/Download/EfD-DP-08-17.pdf.
29. Chen, C., Li, Y., Song, J., Yang, Z., Kuang, Y., Hitz, E., Jia, C., Gong, A., Jiang, F., Zhu, J. Y., et al. (2017). Highly flexible and efficient solar steam generation device. Adv. Mater. 29, 1701756.
30. Zhu, M., Li, Y., Chen, F., Zhu, X., Dai, J., Li, Y., Yang, Z., Yan, X., Song, J., Wang, Y., et al. (2018). Plasmonic wood for high-efficiency solar steam generation. Adv. Energy Mater. 8, 1701028.
31. Li, Y., Gao, T., Yang, Z., Chen, C., Luo, W., Song, J., Hitz, E., Jia, C., Zhou, Y., Liu, B., et al. (2017). 3d-printed, all-in-one evaporator for high-efficiency solar steam generation under 1 sun illumination. Adv. Mater. 29, 1700981.
32. Zhu, M., Yu, J., Ma, C., Zhang, C., Wu, D., and Zhu, H. (2019). Carbonized daikon for high efficient solar steam generation. Sol. Energy Mater. Sol. Cells 191, 83-90.
33. Xue, G., Liu, K., Chen, Q., Yang, P., Li, J., Ding, T., Duan, J., Qi, B., and Zhou, J. (2017). Robust and low-cost flame-treated wood for high-performance solar steam generation. ACS Appl. Mater. Interfaces 9, 15052-15057.
34. Zhang, Z., Mu, P., He, J., Zhu, Z., Sun, H., Wei, H., Liang, W., and Li, A. (2019). Facile and scalable fabrication of surface-modified sponge for efficient solar steam generation. ChemSusChem 12, 426-433.
35. Li, T., Liu, H., Zhao, X., Chen, G., Dai, J., Pastel, G., Jia, C., Chen, C., Hitz, E., Siddhartha, D., et al. (2018). Scalable and highly efficient mesoporous wood-based solar steam generation device: localized heat, rapid water transport. Adv. Funct. Mater. 28, 1707134.
36. Mu, P., Zhang, Z., Bai, W., He, J., Sun, H., Zhu, Z., Liang, W., and Li, A. (2019). Superwetting monolithic hollow-carbon-nanotubes aerogels with hierarchically nanoporous structure for efficient solar steam generation. Adv. Energy Mater. 9, 1802158.
37. Wang, F., Wei, D., Li, Y., Chen, T., Mu, P., Sun, H., Zhu, Z., Liang, W., and Li, A. (2019). Chitosan/reduced graphene oxide-modified spacer fabric as a salt-resistant solar absorber for efficient solar steam generation. J. Mater. Chem. A Mater. Energy Sustain. 7, 18311-18317.
38. Zhao, X., Zha, X. J., Pu, J. H., Bai, L., Bao, R. Y., Liu, Z. Y., Yang, M. B., and Yang, W. (2019). Macroporous three-dimensional mxene architectures for highly efficient solar steam generation. J. Mater. Chem. A Mater. Energy Sustain. 7, 10446-10455.
39. Liu, C., Hong, K., Sun, X., Natan, A., Luan, P., Yang, Y., and Zhu, H. (2020). An 'antifouling' porous loofah sponge with internal microchannels as solar absorbers and water pumpers for thermal desalination. J. Mater. Chem. A Mater. Energy Sustain. 8, 12323-12333.
40. Lu, Y., Dai, T., Fan, D., Min, H., Ding, S., and Yang, X. (2020). Turning trash into treasure: pencil waste-derived materials for solar-powered water evaporation. Energy Technol. (Weinheim) 8, 2000567.
41. Zhang, J., Luo, X., Zhang, X., Xu, Y., Xu, H., Zuo, J., Liu, D., Cui, F., and Wang, W. (2021). Three-dimensional porous photo-thermal fiber felt with salt-resistant property for high efficient solar distillation. Chin. Chem. Lett. 32, 1442-1446.
42. Lu, Y., Wang, X., Fan, D., Yang, H., Xu, H., Min, H., and Yang, X. (2020). Biomass derived janus solar evaporator for synergic water evaporation and purification. Sustain. Mater. Technol. 25, e00180.
43. Dong, X., Si, Y., Chen, C., Ding, B., and Deng, H. (2021). Reed leaves inspired silica nanofibrous aerogels with parallel-arranged vessels for salt-resistant solar desalination. ACS Nano. https://doi.org/10.1021/acsnano.1c04035.
44. Tian, Y., Qian, L., Liu, X., Ghanekar, A., Liu, J., Thundat, T., Xiao, G., and Zheng, Y. (2021). High-temperature and abrasion-resistant metal-insulator-metal metamaterials. Mater. Today Energy 21, 100725.

SUPPLEMENTAL REFERENCES

1. Chen, C., Li, Y., Song, J., Yang, Z., Kuang, Y., Hitz, E., Jia, C., Gong, A., Jiang, F., Zhu, J. Y., et al. (2017). Highly flexible and efficient solar steam generation device. Advanced Materials, 29(30), p. 1701756.
2. Xu, N., Hu, X., Xu, W., Li, X., Zhou, L., Zhu, S. and Zhu, J. (2017). Mushrooms as efficient solar steam-generation devices. Advanced Materials, 29(28), p. 1606762.
3. Zhu, M., Li, Y., Chen, F., Zhu, X., Dai, J., Li, Y., Yang, Z., Yan, X., Song, J., Wang, Y., et al. (2018). Plasmonic wood for high-efficiency solar steam generation. Advanced Energy Materials, 8(4), p. 1701028.
4. Li, Y., Gao, T., Yang, Z., Chen, C., Luo, W., Song, J., Hitz, E., Jia, C., Zhou, Y., Liu, B., et al. (2017). 3D-printed, all-in-one evaporator for high-efficiency solar steam generation under 1 sun illumination. Advanced materials, 29(26), p. 1700981.
5. Zhu, M., Yu, J., Ma, C., Zhang, C., Wu, D. and Zhu, H. (2019). Carbonized daikon for high efficient solar steam generation. Solar Energy Materials and Solar Cells, 191, pp. 83-90.
6. Xue, G., Liu, K., Chen, Q., Yang, P., Li, J., Ding, T., Duan, J., Qi, B. and Zhou, J. (2017). Robust and low-cost flame-treated wood for high-performance solar steam generation. ACS applied materials & interfaces, 9(17), pp. 15052-15057.
7. Zhang, Z., Mu, P., He, J., Zhu, Z., Sun, H., Wei, H., Liang, W. and Li, A. (2019). Facile and scalable fabrication of surface-modified sponge for efficient solar steam generation. ChemSusChem, 12(2), pp. 426-433.
8. Li, T., Liu, H., Zhao, X., Chen, G., Dai, J., Pastel, G., Jia, C., Chen, C., Hitz, E., Siddhartha, D., et al. (2018). Scalable and highly efficient mesoporous wood-based solar steam generation device: localized heat, rapid water transport. Advanced Functional Materials, 28(16), p. 1707134.
9. Mu, P., Zhang, Z., Bai, W., He, J., Sun, H., Zhu, Z., Liang, W. and Li, A. (2019). Superwetting monolithic hollow-carbon-nanotubes aerogels with hierarchically nanoporous structure for efficient solar steam generation. Advanced Energy Materials, 9(1), p. 1802158.
10. Wang, F., Wei, D., Li, Y., Chen, T., Mu, P., Sun, H., Zhu, Z., Liang, W. and Li, A. (2019). Chitosan/reduced graphene oxide-modified spacer fabric as a salt-resistant solar absorber for efficient solar steam generation. Journal of Materials Chemistry A, 7(31), pp. 18311-18317.
11. Zhao, X., Zha, X. J., Pu, J. H., Bai, L., Bao, R. Y., Liu, Z. Y., Yang, M. B. and Yang, W. (2019). Macroporous three-dimensional MXene architectures for highly efficient solar steam generation. Journal of Materials Chemistry A, 7(17), pp. 10446-10455.
12. Liu, C., Hong, K., Sun, X., Natan, A., Luan, P., Yang, Y. and Zhu, H. (2020). An 'antifouling' porous loofah sponge with internal microchannels as solar absorbers and water pumpers for thermal desalination. Journal of Materials Chemistry A, 8(25), pp. 12323-12333.
13. Lu, Y., Dai, T., Fan, D., Min, H., Ding, S. and Yang, X. (2020). Turning Trash into Treasure: Pencil Waste-Derived Materials for Solar-Powered Water Evaporation. Energy Technology, 8(10), p. 2000567.
14. Zhang, J., Luo, X., Zhang, X., Xu, Y., Xu, H., Zuo, J., Liu, D., Cui, F. and Wang, W. (2021). Three-dimensional porous photo-thermal fiber felt with salt-resistant property for high efficient solar distillation. Chinese Chemical Letters, 32(4), pp. 1442-1446.
15. Lu, Y., Fan, D., Wang, Y., Xu, H., Lu, C. and Yang, X. (2021). Surface Patterning of Two-Dimensional Nanostructure-Embedded Photothermal Hydrogels for High-Yield Solar Steam Generation. ACS nano, 15 (6), 10366-10376.
16. Lu, Y., Wang, X., Fan, D., Yang, H., Xu, H., Min, H. and Yang, X. (2020). Biomass derived Janus solar evaporator for synergic water evaporation and purification. Sustainable Materials and Technologies, 25, p. e00180.
17. Dong, X., Cao, L., Si, Y., Ding, B. and Deng, H. (2020). Cellular Structured CNTs@ SiO2 Nanofibrous Aerogels with Vertically Aligned Vessels for Salt-Resistant Solar Desalination. Advanced Materials, 32(34), p. 1908269.
18. Gao, T., Wu, X., Owens, G. and Xu, H. L. (2020). A cobalt oxide@ polydopamine-reduced graphene oxide-based 3D photothermal evaporator for highly efficient solar steam generation. Tungsten, 2(4), pp. 423-432.
19. Lu, Y., Fan, D., Xu, H., Min, H., Lu, C., Lin, Z. and Yang, X. (2020). Implementing hybrid energy harvesting in 3D spherical evaporator for solar steam generation and synergic water purification. Solar RRL, 4(9), p. 2000232.
20. Wang, Y., Wu, X., Shao, B., Yang, X., Owens, G. and Xu, H. (2020). Boosting solar steam generation by structure enhanced energy management. Science Bulletin, 65(16), pp. 1380-1388.
21. Dong, X., Si, Y., Chen, C., Ding, B. and Deng, H. (2021). Reed Leaves Inspired Silica Nanofibrous Aerogels with Parallel-Arranged Vessels for Salt-Resistant Solar Desalination. ACS nano, 15(7), 12256-12266.
22. Cao, N., Lu, S., Yao, R., Liu, C., Xiong, Q., Qin, W. and Wu, X. (2020). A self-regenerating air-laid paper wrapped ASA 3D cone-shaped Janus evaporator for efficient and stable solar desalination. Chemical Engineering Journal, 397, p. 125522.
23. Liu, X., Tian, Y., Chen, F., Caratenuto, A., DeGiorgis, J. A., ELSonbaty, M., Wan, Y., Ahlgren, R. and Zheng, Y. (2021). An Easy-to-Fabricate 2.5 D Evaporator for Efficient Solar Desalination. Advanced Functional Materials, p. 2100911.

The invention claimed is:

1. A photothermal evaporator for a water desalination system, comprising:
a planar carbonized manure (CM) body having a first side, a second side opposing the first side, a thickness therebetween, and an interconnected channel structure formed by black carbon fibers of the CM body;
wherein the first side is positionable in contact with a body of water and the second side is exposed to air and incident sunlight above the body of water;
wherein the interconnected channel structure transports water from the first side to the second side via capillary action, thereby generating an ion concentration gradient between the first side and second side, allowing salt to diffuse back toward the body of water; and
wherein the CM body converts the incident sunlight to heat at the second side for evaporating the transported water.

2. The photothermal evaporator of claim 1, wherein the CM body includes randomly arranged black carbon fibers defining water transport and salt-rejection channels.

3. The photothermal evaporator of claim 1, wherein the CM body includes randomly arranged black carbon fibers forming a macropore structure configured to trap and scatter the incident sunlight inside the CM evaporator.

4. The photothermal evaporator of claim 1, wherein the CM body comprises manure that has been pressed, dried, and carbonized.

5. The photothermal evaporator of claim 1, wherein the manure comprises farm animal manure.

6. The photothermal evaporator of claim 1, wherein the CM body is recyclable.

7. The photothermal evaporator of claim 1, wherein the CM body has a solar absorptance of about 0.98.

8. The photothermal evaporator of claim 1, wherein the CM body has an evaporation rate of about 2.8 kg m$^{-2}$ h$^{-1}$ under 1 sun irradiance.

9. The photothermal evaporator of claim 1, wherein the CM body is capable of stable operation in water comprising at least 15 wt % NaCl solution without salt accumulation.

10. A method of manufacturing a photothermal evaporator for a water desalination system, comprising the steps of:

(a) crushing manure into pieces;
(b) molding the pieces of manure into a bulk form;
(c) drying the manure in the bulk form to form dried manure; and
(d) carbonizing the dried manure to form a carbonized manure (CM) evaporator having a first side, a second side opposing the first side, a thickness therebetween, and an interconnected channel structure formed by black carbon fibers of the CM evaporator.

11. The method of claim 10, wherein step (a) is performed using a blender.

12. The method of claim 10, wherein step (b) comprises molding the pieces of manure into a planar slab.

13. The method of claim 10, wherein step (c) is performed by heating the manure at about 180° C.

14. The method of claim 10, wherein step (d) is performed in an inert gas or vacuum environment.

15. The method of claim 10, further comprising recycling the CM evaporator by mixing the CM evaporator with fresh manure to form a mixed manure, molding the mixed manure into a bulk form, drying the manure in the bulk form to form a dried manure, and carbonizing the dried manure to form a recycled CM evaporator.

16. The method of claim 10, wherein the CM evaporator is configured to have one side positioned in a body of water and an opposite side positioned in air above the body of water and exposed to incident sunlight, and said CM evaporator is configured to draw water from the body of water through capillary action, convert the incident sunlight to heat for evaporating the water, and reject salt to the body of water.

17. The method of claim 10, wherein the CM evaporator includes randomly arranged black carbon fibers defining water transport and salt-rejection channels.

18. The method of claim 10, wherein the CM evaporator includes randomly arranged black carbon fibers forming a macropore structure configured to trap and scatter incident sunlight inside the CM evaporator.

* * * * *